(12) United States Patent
Yoshikawa et al.

(10) Patent No.: US 7,090,245 B2
(45) Date of Patent: Aug. 15, 2006

(54) LEG PROTECTION SYSTEM AND VEHICLE HAVING THE SAME

(75) Inventors: Hiromichi Yoshikawa, Shiga (JP); Kazuhiro Abe, Shiga (JP)

(73) Assignee: Takata Corporation, Tokyo (JP)

( * ) Notice: Subject to any disclaimer, the term of this patent is extended or adjusted under 35 U.S.C. 154(b) by 238 days.

(21) Appl. No.: 10/665,482

(22) Filed: Sep. 22, 2003

(65) Prior Publication Data
US 2004/0113399 A1 Jun. 17, 2004

(30) Foreign Application Priority Data

Dec. 16, 2002 (JP) ............................. 2002-364011
Dec. 16, 2002 (JP) ............................. 2002-364012
Dec. 16, 2002 (JP) ............................. 2002-364013

(51) Int. Cl.
*B60R 21/233* (2006.01)

(52) U.S. Cl. .................................... 280/729; 280/730.1

(58) Field of Classification Search ............... 280/729, 280/730.1, 730.2, 752, 243.1, 243.2
See application file for complete search history.

(56) References Cited

U.S. PATENT DOCUMENTS

| | | | | |
|---|---|---|---|---|
| 2,834,606 A | * | 5/1958 | Bertrand | .................. 280/730.1 |
| 3,768,830 A | * | 10/1973 | Hass | .......................... 280/729 |
| 4,300,894 A | * | 11/1981 | Cumming et al. | .......... 493/210 |
| 6,092,836 A | | 7/2000 | Saslecov | |
| 6,217,059 B1 | | 4/2001 | Brown et al. | |
| 6,371,511 B1 | * | 4/2002 | Kitagawa | ................. 280/730.1 |
| 6,464,246 B1 | | 10/2002 | Bayley | |
| 6,685,217 B1 | * | 2/2004 | Abe | ........................ 280/730.1 |
| 6,752,417 B1 | * | 6/2004 | Takimoto et al. | ........ 280/730.1 |
| 6,916,039 B1 | * | 7/2005 | Abe | ........................... 280/729 |
| 2001/0017454 A1 | | 8/2001 | Bayley | |
| 2002/0171231 A1 | | 11/2002 | Takimoto et al. | |
| 2003/0132617 A1 | | 7/2003 | Takimoto et al. | |

FOREIGN PATENT DOCUMENTS

| | | |
|---|---|---|
| DE | 100 21 893 | 11/2001 |
| JP | 10-315894 | 12/1998 |
| JP | 2000-289562 | 10/2000 |
| JP | 2002-160672 | 6/2002 |

* cited by examiner

*Primary Examiner*—David R. Dunn
(74) *Attorney, Agent, or Firm*—Manabu Kanesaka

(57) ABSTRACT

A leg protection system includes an airbag that deploys in front of a leg of an occupant seated in a vehicle seat. The airbag first deploys in front of an ankle or an instep of the leg, and then deploys upwardly along the leg. An airbag may include an ankle bag that deploys only in front of the ankle or the instep, and a knee bag that deploys only in front of the knee. A vehicle may further include a closing panel for blocking a space between a lower end of an instrument panel and a dash panel.

4 Claims, 14 Drawing Sheets

Ankle section

LEG PROTECTION SYSTEM AND VEHICLE HAVING THE SAME

BACKGROUND OF THE INVENTION AND RELATED ART STATEMENT

The present invention relates to a leg protection system for preventing legs of an occupant from hitting against an instrument panel and so on in the event of a frontal crash of a vehicle. More specifically, the present invention relates to a leg protection system equipped with an airbag that deploys in front of legs of an occupant in a seat, and a vehicle having the leg protection system.

Japanese Patent Publication (Kokai) No. 10-315894 has disclosed a leg protection system equipped with an airbag that deploys in front of legs of an occupant in a car seat. The airbag is inflated in front of knees downwardly along a shin.

In the leg protection system, a lower part of an airbag is inflated at a space between an instrument panel/a dash panel and ankles or insteps of the legs for absorbing an impact applied to the ankles or the insteps.

An occupant generally sits on a seat such that in the legs lower than knees, toes are located at forward positions. Therefore, when the airbag deploys downwardly from the knee to the shin, as disclosed in the Japanese Patent Publication No. 10-315894, the airbag deploys in a direction that the leg moves forward.

Also, in the leg protecting system disclosed in Japanese Patent Publication No. 10-315894, before the airbag reaches the ankle or the instep, it is possible that the ankle or the instep moves forward to hit the dash panel and so on.

Further, in the leg protecting system disclosed in Japanese Patent Publication No. 10-315894, there is a space between a lower end of the instrument panel and the dash panel. A lower part of the airbag may be retracted into the space. Therefore, in order to sufficiently receive the ankles or the insteps, it is necessary to increase a capacity and an inner pressure of the airbag, thereby increasing a cost.

In view of the problems described above, it is an object of the present invention to provide a leg protection system in which an airbag deploys in a direction opposite to a direction that legs move forward. Therefore, it is possible to effectively prevent the legs from moving forward, and restrain ankles or insteps in an early stage.

It is another object of the present invention to provide a leg protection system having an airbag capable of inflating between legs and an instrument panel, and the airbag is prevented from entering a space between the instrument panel and a dash panel.

Further objects and advantages of the invention will be apparent from the following description of the invention.

SUMMARY OF THE INVENTION

According to the first aspect of the present invention, a leg protection system includes an airbag that deploys in front of legs of an occupant seated in a vehicle seat. The airbag first deploys in front of ankles or insteps of the legs, and then deploys upwardly along the legs.

In the first aspect of the invention, the leg protection system first deploys the airbag in front of the ankles or the insteps of the occupant's legs to prevent forward movements thereof, and then deploys upwardly along the legs. Therefore, the airbag receives the ankles or the insteps at an early stage, thereby preventing the forward movements thereof. The airbag deploys in a direction opposite to a direction that the legs move forward relative to the occupant seated in a normal position. Accordingly, the deploying airbag effectively applies a force to prevent the forward movements of the legs, so that the legs do not move forward much.

According to the first aspect of the present invention, the airbag may first deploy in front of the ankles or the insteps, and then deploy in front of the knees, so that the airbag sufficiently prevents the forward movements of the knees, thighs, and lumbar parts.

According to the second aspect of the present invention, a leg protection system includes an airbag that deploys in front of legs of an occupant seated in a vehicle seat. The airbag deploys substantially only in front of ankles or insteps of the occupant's leg. In the leg protection system, the airbag restrains the ankles or the insteps at an early stage, thereby preventing the ankles or the insteps from hitting the dash panel and so on.

According to the second aspect of the present invention, a leg protection system includes an airbag that deploys in front of legs of an occupant seated in a vehicle seat. The airbag deploys substantially only in front of the ankles or the insteps, and in front of knees of the legs. In the leg protection system, the airbag restrains the ankles or the insteps at an early stage, thereby preventing the ankles or the insteps from hitting the dash panel and so on.

In the leg protection system, the airbag receives two portions of each leg, i.e. a lower portion (the ankle or the instep) and an upper portion (the knee), so that a middle portion between the lower portion and the upper portion, i.e. a shin, can be prevented from moving forward even if the airbag does not receive directly the shin. Therefore, the airbag is inflated only at the two portions, i.e. the ankle or the instep and the knee, to prevent the whole leg from moving forward. The airbag does not receive the shin, so that a capacity of the entire airbag can be decreased, and the airbag can be inflated fast even with a low-output inflator.

According to the second aspect of the present invention, an airbag includes an ankle bag that deploys only in front of the ankles or the instep and a knee bag that deploys only in front of the knees. With this configuration, it is possible to arrange the ankle bag and the knee bag separately, thereby obtaining flexibility in arranging the bags.

According to the second aspect of the present invention, an airbag is formed in a bag shape integrally including an ankle section that deploys only in front of the ankles or the insteps and a knee section that deploys only in front of the knees. With this configuration, since the airbag is formed of one single bag, it is sufficient to provide one retainer for housing the airbag, thereby facilitating a process of mounting of the leg protection system to a vehicle.

According to the third aspect of the present invention, a vehicle has a leg protection system, and the leg protection system includes an airbag capable of deploying between the legs of the occupant seated in a vehicle seat and the instrument panel in front of the seat. The vehicle further includes a closing panel for blocking a space between a lower end of the instrument panel and a dash panel.

In the third aspect of the present invention, the vehicle has the closing panel for blocking the space between the lower end of the instrument panel and the dash panel. As a result, it is possible to prevent the inflated airbag from entering the space. Accordingly, it is not necessary to increase a capacity and an inner pressure of the airbag in order to securely receive the ankles or the insteps of the occupant as compared with a conventional system, thereby reducing a manufacturing cost.

According to the third aspect of the present invention, the leg protection system may be disposed in any of the instrument panel, the dash panel, or the closing panel. When the leg protection system is mounted to the closing panel, a process of mounting the closing panel may be combined with a process of mounting the leg protection system.

According to the third aspect of the present invention, the leg protection system may include an airbag capable of deploying between the legs of the occupant seated in a vehicle seat and the instrument panel in front of the seat. The lower end of the instrument panel is substantially flush with the dash panel. With this arrangement, there is substantially no space between the lower end of the instrument panel and the dash panel, so that the lower part of the airbag does not enter the space.

BRIEF DESCRIPTION OF THE DRAWINGS

FIGS. 2(a)–2(d) are schematic views of an airbag of the leg protection system shown in FIG. 1, wherein FIG. 2(a) is a front view of the airbag, and FIGS. 2(b), 2(c), and 2(d) are sectional views thereof taken along lines 2(b)—2(b), 2(c)—2(c), and 2(d)—2(d) in FIG. 2(a), respectively;

FIGS. 3(a)–3(d) are schematic views of an airbag of the leg protection system, wherein FIG. 3(a) is a front view of the airbag, and FIGS. 3(b), 3(c), and 3(d) are sectional views thereof taken along lines 3(b)—3(b), 3(c)—3(c), and 3(d)—3(d) in FIG. 3(a), respectively;

FIGS. 5(a)–5(d) are schematic views of an airbag of the leg protection system shown in FIG. 4, wherein FIG. 5(a) is a front view of the airbag, and FIGS. 5(b), 5(c), and 5(d) are sectional views thereof taken along lines 5(b)—5(b), 5(c)—5(c), and 5(d)—5(d) in FIG. 5(a), respectively;

FIGS. 6(a)–6(d) are schematic views of an airbag of the leg protection system, wherein FIG. 6(a) is a front view of the airbag, and FIGS. 6(b), 6(c), and 6(d) are sectional views thereof taken along lines 6(b)—6(b), 6(c)—6(c), and 6(d)—6(d) in FIG. 6(a), respectively;

FIG. 7(b) shows a state when the airbag is inflated;

FIGS. 16(a) and 16(b) are sectional views of a vehicle having a leg protection system according to an embodiment of the third aspect of the invention, wherein FIG. 16(a) shows a state before an airbag is inflated, and FIG. 16(b) shows a state when the airbag is inflated;

DETAILED DESCRIPTION OF PREFERRED EMBODIMENTS

Figure 1:
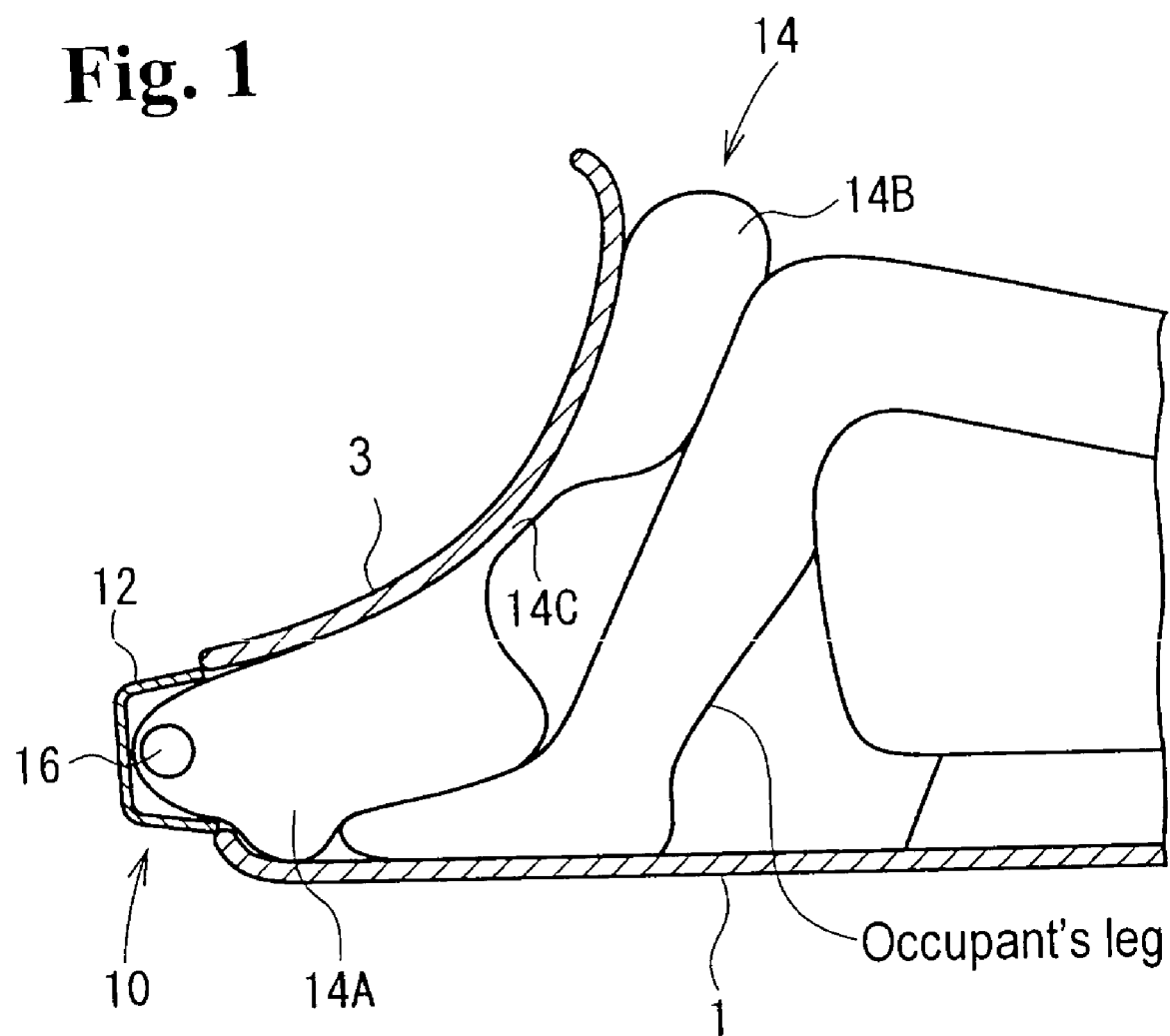
FIG. 1 is a side view of an interior of a vehicle equipped with a leg protection system according to an embodiment of the first aspect of the present invention.
Figure 2A:
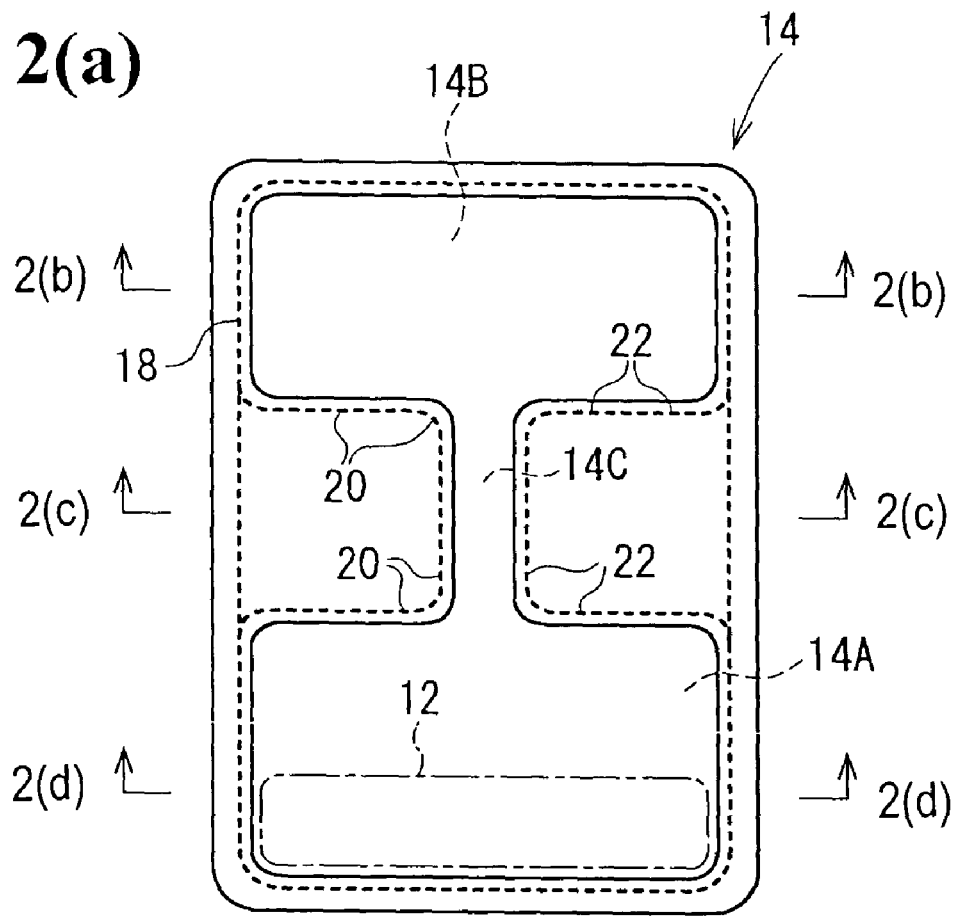
Figure 2B:
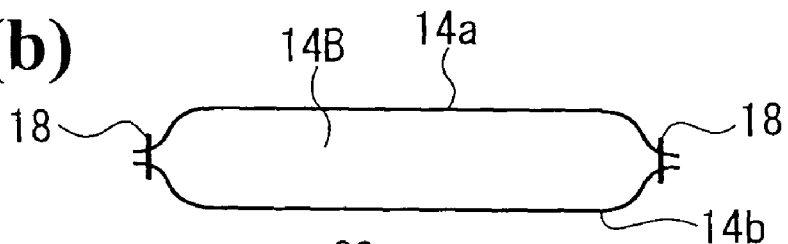
Figure 2C:
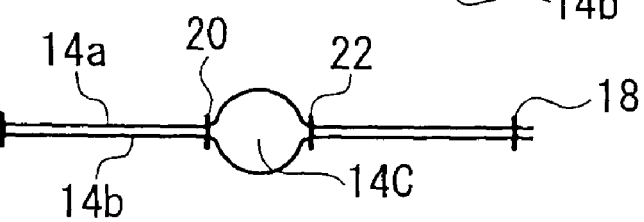
Figure 2D:
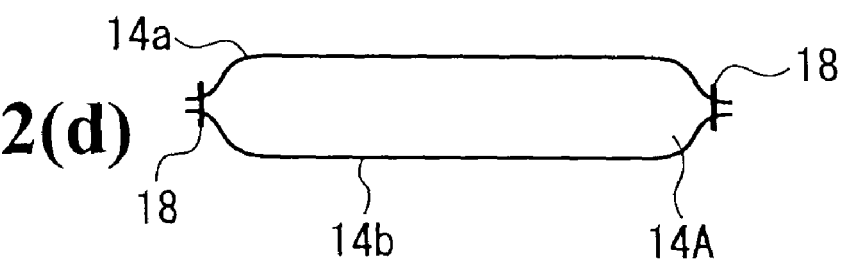
Figure 3A:
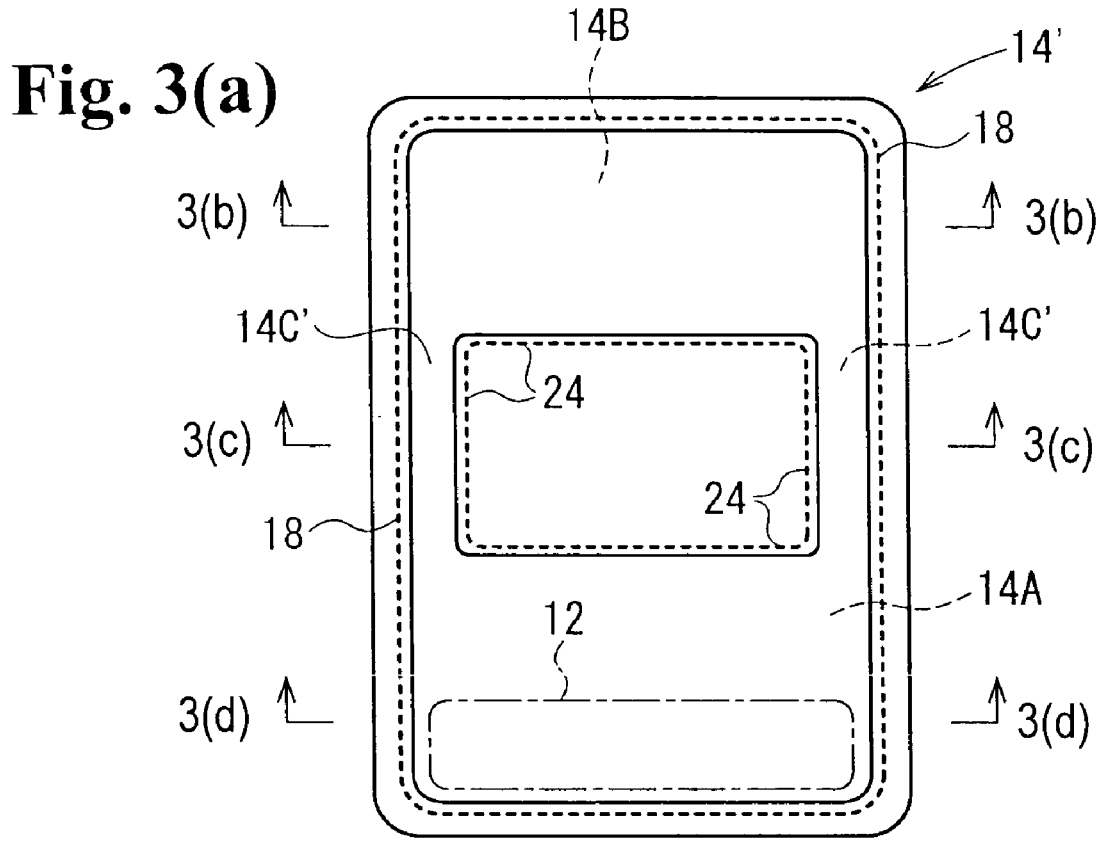
Figure 3B:
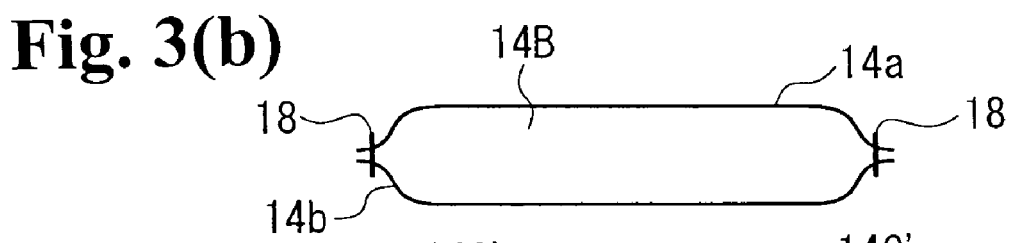
Figure 3C:
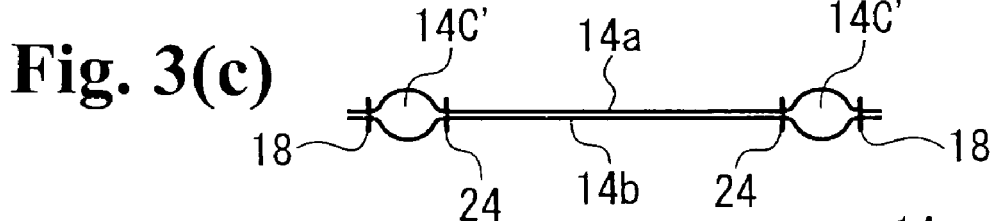
Figure 3D:
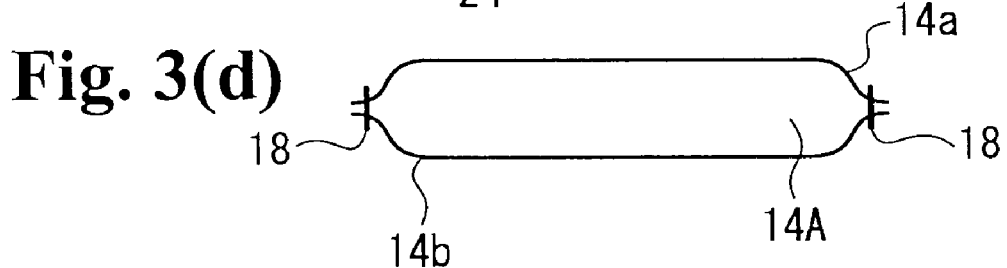

Hereunder, embodiments of the first aspect of the present invention will be explained with reference to the accompanying drawing. FIG. 1 is a side view of an interior of a vehicle equipped with a leg protection system according to an embodiment. FIGS. 2(a)–2(d) are schematic views of an airbag of the leg protection system shown in FIG. 1, wherein FIG. 2(a) is a front view of the airbag, and FIGS. 2(b), 2(c), and 2(d) are sectional views thereof taken along lines 2(b)—2(b), 2(c)—2(c), and 2(d)—2(d) in FIG. 2(a), respectively.

As shown in FIG. 1, a leg protection system 10 is mounted on a dash panel 4 (not shown in FIG. 1, refer to FIG. 4) connecting a front end of a floor panel 1 and a lower end of an instrument panel 3. The dash panel 4 extends substantially upwardly from the front end of the floor panel 1 so as to face a toe of the occupant. The instrument panel 3 has a curved convex shape toward the interior of the vehicle so as to face a vicinity of the toe to a knee of the occupant's leg.

The leg protection system 10 includes a casing 12 with an open front portion (facing the occupant), an airbag 14 housed in the casing 12 in a folded state, and an inflator 16 for inflating the airbag 14. A lid (not shown) covers the front portion of the casing 12.

As shown in FIGS. 1 and 2(a), the airbag 14 includes a lower chamber 14A that deploys from the toe to the ankle, an upper chamber 14B that deploys in front of the knee above the ankle, and a duct 14C for communicating the lower chamber 14A and the upper chamber 14B.

The inflator 16 has a column shape and is arranged to pass through the lower chamber 14A along a width direction of the vehicle. The airbag 14 is fixed to the casing 12 with a fastener (not shown) at a rear portion of the inflator 16. The airbag 14 is mounted to the casing 12 at a portion along a lower side of the lower chamber 14A. The shape of the inflator 16 is not limited to the column, and may be a disk shape, etc.

In the embodiment, a front panel 14a has a substantially rectangular shape, and forms a front surface of the airbag 14. A rear panel 14b has a shape substantially the same as that of the front panel 14a, and forms a rear surface of the airbag 14. The front panel 14a and the rear panel 14b are joined together along a seam 18 at peripheries thereof, so that the airbag 14 is formed in a bag shape. The front panel 14a and the rear panel 14b are also joined together along seams 20 and 22 extending toward a center of the airbag from left and right sides at the middle between the front panel 14a and the rear panel 14b in the vertical direction, respectively, so that the airbag 14 is divided into the lower chamber 14A, the upper chamber 14B, and the duct 14C.

Each of the seams 20 and 22 has a substantially U-shape, in which one side extends vertically and the other two sides extend laterally parallel to an upper side and a lower side of the front panel 14a and the rear panel 14b. The sides vertically extending face each other at the middle of the front panel 14a and the rear panel 14b in the lateral direction. A space between the sides serves as the duct 14C. Both ends of each of the seams 20 and 22 join the seam 18. A method of joining the front panel 14a to the rear panel 14b may include various methods such as bonding and welding in addition to the stitching.

When a vehicle equipped with the leg protection system 10 having such a configuration comes in a frontal crash, the inflator 16 is activated to emit gas into the airbag 14. The airbag 14 starts to inflate by the gas from the inflator 16, and push the lid to open, thereby starting to deploy between the legs and the instrument panel 3.

In the airbag 14, the lower chamber 14A first deploys in front of the toes to the ankles of the legs by the gas from the inflator 16, thereby preventing the forward movement thereof. The gas in the lower chamber 14A then flows into the upper chamber 14B through the duct 14C to deploy the airbag 14 upwardly along the legs and to inflate the upper chamber 14B, thereby preventing the forward movements of the knees, the thighs, and the lumbar part.

The airbag 14 deploys in a direction opposite to a direction that the legs for the occupant seated in a normal position move forward. Accordingly, the deployed airbag 14 applies a force to the legs to prevent the forward movement thereof, so that the legs moves forward little.

In the embodiment, the airbag 14 has the duct 14C at the middle thereof in the vertical direction. Therefore, the airbag 14 has an inner capacity smaller than that of an airbag in which the whole portion thereof is inflated, thereby requiring less output, of the inflator 16.

In the embodiment, the lower chamber 14A and the upper chamber 14B of the airbag 14 communicate with each other through the duct 14C. The lower chamber 14A and the upper chamber 14B may communicate through more than one duct. As shown in FIG. 2(a), the embodiment has the duct 14C around the middle of the airbag 14 in the lateral direction. Alternatively, as shown in an airbag 14' in FIGS. 3(a)–3(d), two ducts 14C' may be disposed along the left and right sides, through which the lower chamber 14A and the upper chamber 14B communicate with each other. Three or more ducts may be provided (not shown).

As shown in FIGS. 3(a)–3(d), the front panel 14a is joined to the rear panel 14b along a seam 24 formed at the center of the airbag, so that an interior of the airbag 14' is divided into the lower chamber 14A, the upper chamber 14B, and the two ducts 14C'. The seam 24 has a substantially rectangular shape, in which a pair of sides extends vertically parallel to the sides of the front panel 14a and the rear panel 14b, and a pair of other sides extends laterally parallel to the upper side and the lower side of the front panel 14a and the rear panel 14b. The sides extending vertically are located away from the seams 18 toward the center of the airbag, and the spaces between the sides and the seams 18 serve as the ducts 14C'.

Other features of the airbag 14' shown in FIG. 3(a)–3(d) and the leg protection system equipped with the airbag 14' are the same as those of the leg protection system 10 shown in FIGS. 1 and 2(a)–2(d). Therefore, the components in FIGS. 3(a)–3(d) same as those in FIGS. 1 and 2(a)–2(d) are designated by the same reference numerals, and descriptions thereof are omitted.

Figure 4:
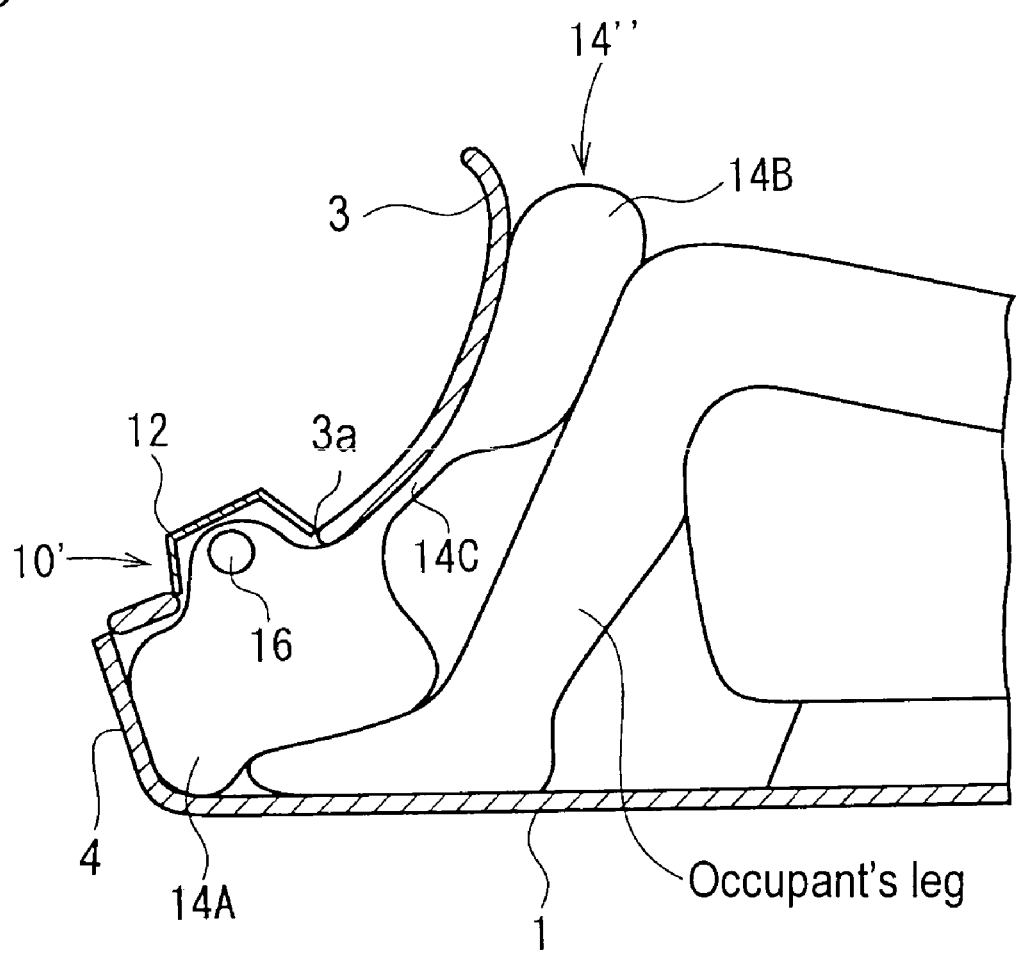
FIG. 4 is a side view of an interior of a vehicle equipped with the leg protection system according to another embodiment.
Figure 5A:
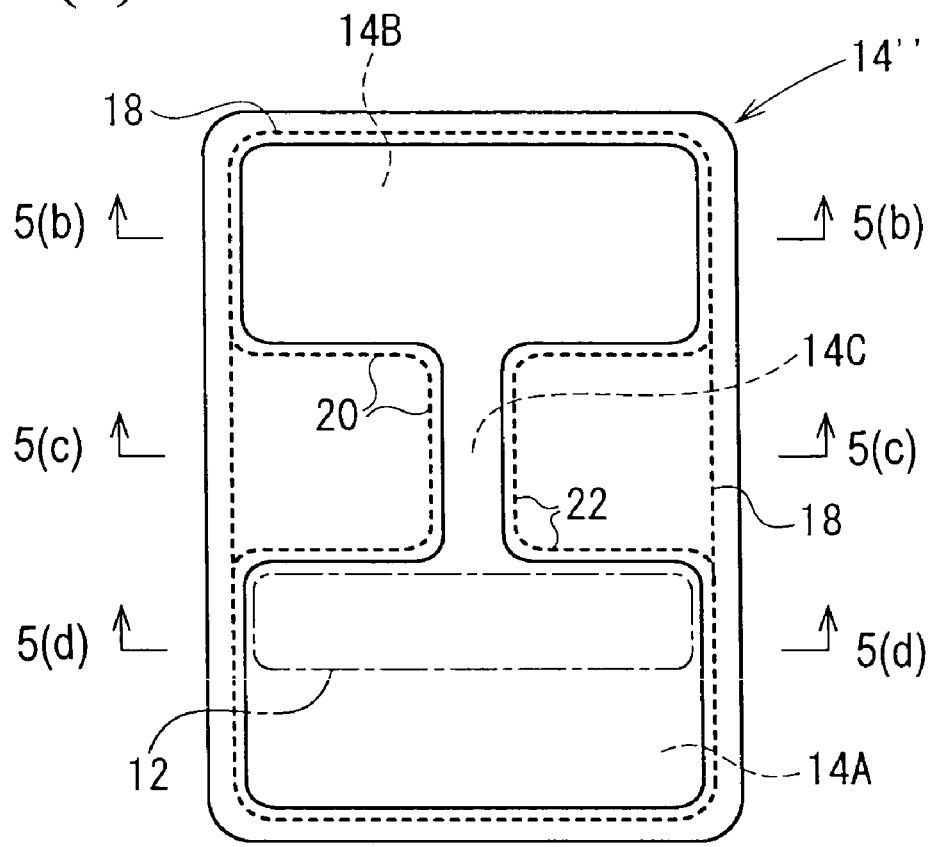
Figure 5B:
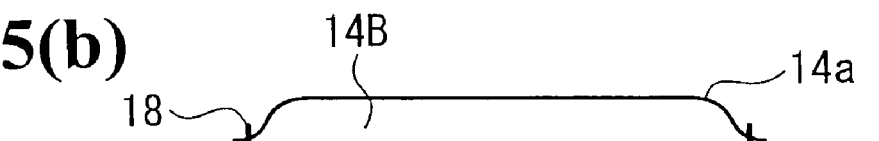
Figure 5C:
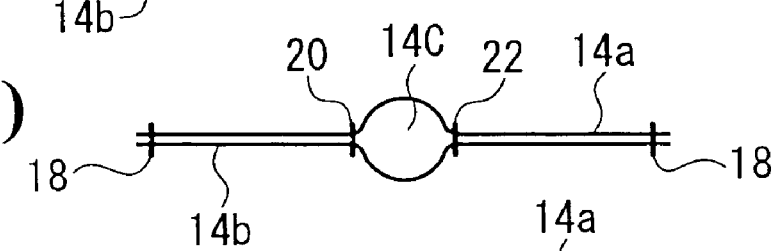
Figure 5D:
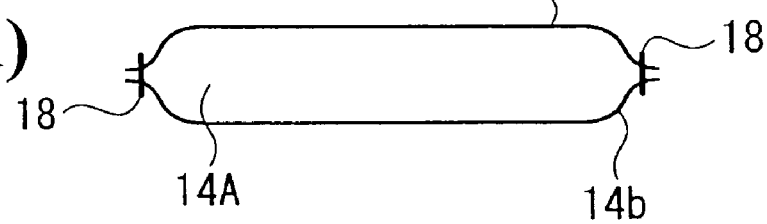
Figure 6A:
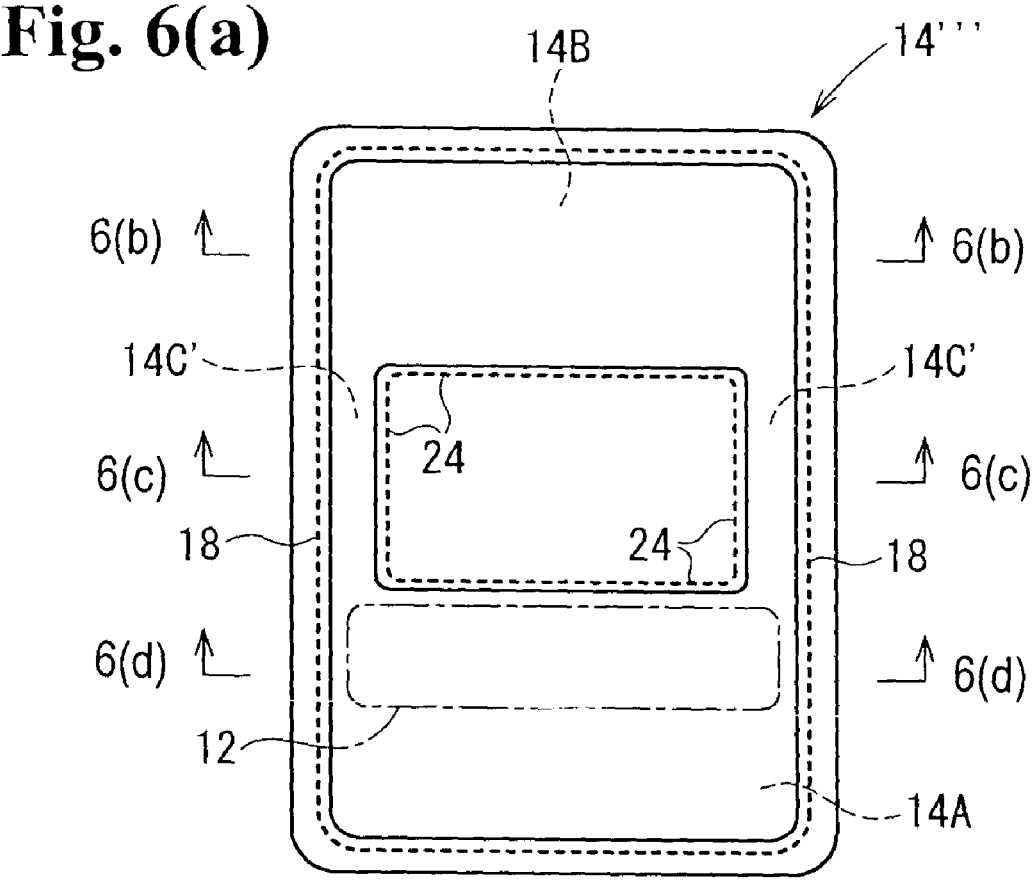
Figure 6B:
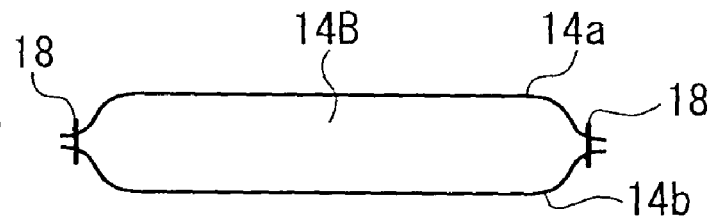
Figure 6C:
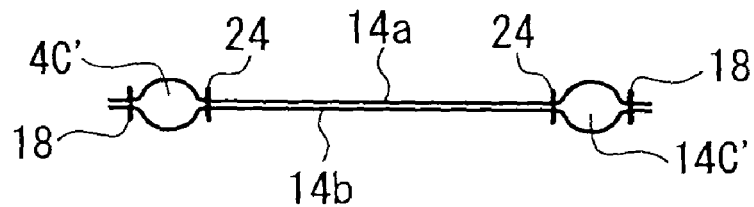
Figure 6D:
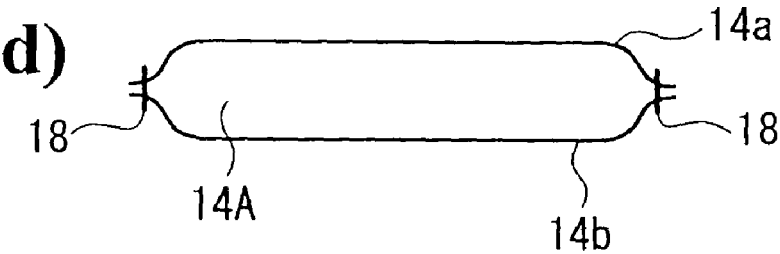

FIG. 4 is a side view of a front end of an interior of a vehicle equipped with a leg protection system according to another embodiment. FIG. 5(a) is a front view of an airbag of the leg protection system; and FIGS. 5(b), 5(c), and 5(d) are sectional views thereof taken along lines 5(b)—5(b), 5(c)—5(c), and 5(d)—5(d) in FIG. 5(a), respectively.

As shown in FIG. 4, an opening 3a for passing the airbag therethrough is provided at a lower part of the instrument panel 3 and at a height facing the ankles or the insteps of the occupant's legs. A leg protection system 10' is disposed on a backside of the instrument panel 3 so as to face the opening 3a. The leg protection system 10' also has the casing 12 with an open front (facing the occupant), an airbag 14" housed 1A the casing 12 in a folded state, and the inflator 16 for inflating the airbag 14", as in the leg protection system 10 shown in FIG. 1. The front portion of the casing 12 is arranged to face the opening 3a. A lid (not shown) covers the opening 3a, and is flush with the instrument panel 3.

The airbag 14" also includes the lower chamber 14A that deploys in front of the ankles or the insteps of the occupant's legs, the upper chamber 14B that deploys in front of the knees above the toes, and the duct 14C for communicating the lower chamber 14A and the upper chamber 14B with each other, as in the airbag 14 shown in FIGS. 1 and 2(a)–2(d). The inflator 16 is arranged to pass through the lower chamber 14A along the width of the vehicle. The airbag 14" is joined to the casing 12 with a fastener (not shown) at a rear portion of the inflator 16. The airbag 14" is mounted to the casing 12 along an upper side of the lower chamber 14A.

Other features in the airbag 14" are the same as those in the airbag 14 shown in FIGS. 1 and 2(a)–2(d). Therefore, components shown in FIGS. 5(a)–5(d) and 6(a)–6(d) same as those in FIGS. 1 and 2(a)–2(d) are designated by the same reference numerals, and descriptions thereof are omitted.

In the leg protection system 10', the lower chamber 14A is inflated first to deploy in front of the toes to the ankles of the occupant's legs by the gas from the inflator 16, and the airbag 14" then deploys upwardly, thereby inflating the upper chamber 14B.

The airbag 14" deploys in a direction opposite to the direction that the legs move forward. Thus, the deploying airbag 14" applies a force to the legs to preventing from moving forward, so that the legs move forward little. As shown in FIGS. 4 and 5(a)–5(d), the leg protection system disposed under the instrument panel may include two or more ducts, as in an airbag 14''' shown in FIGS. 6(a)–6(d).

A configuration of the airbag 14''' shown in FIGS. 6(a)–6(d) is the same as that of the airbag 14' shown in FIGS. 3(a)–3(d), except that the rear surface (rear panel 14b) at an upper part of the lower chamber 14A is joined to the casing 12. According to the embodiments described above, the airbag includes the upper chamber, the lower chamber, and the duct. Alternatively, the airbag may include only one chamber.

As described above, according to the first aspect of the present invention, the leg protection system deploys the airbag in the direction opposite to the direction that the legs move forward, thereby effectively preventing the legs from moving forward and retraining the ankles or the insteps at an early stage.

Figure 7A:
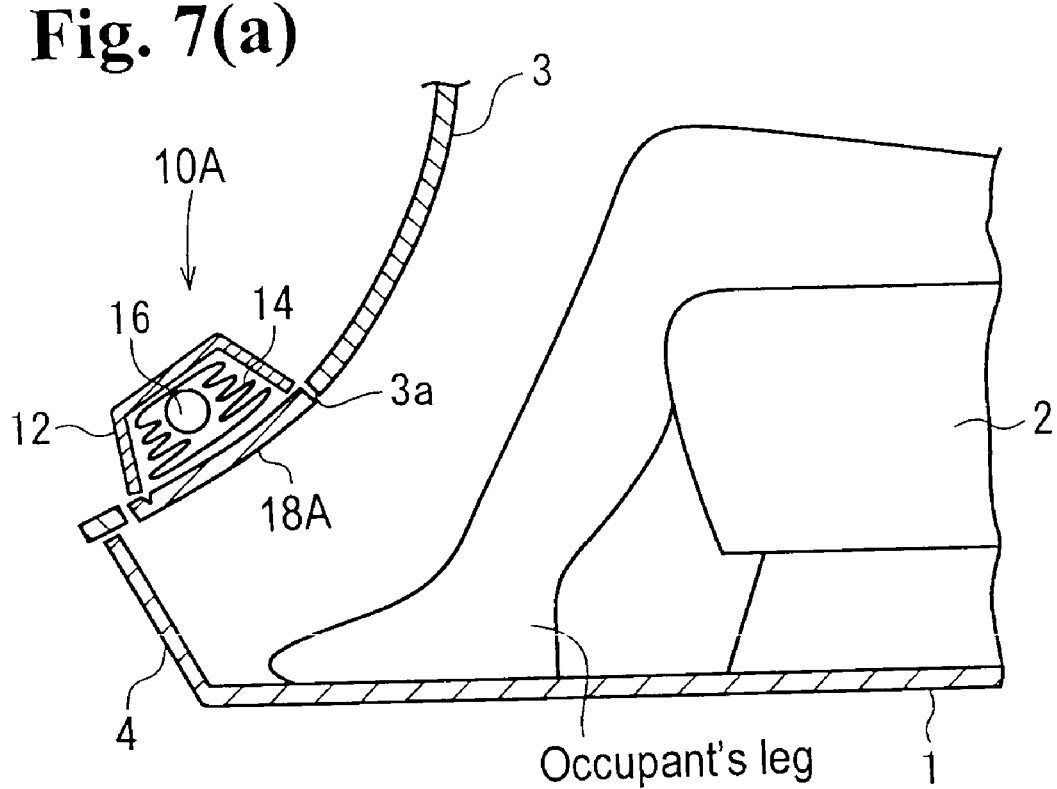
FIGS. 7(a) and 7(b) are sectional views of a leg protection system according to an embodiment of the second aspect of the present invention, wherein FIG. 7(a) show a state before an airbag is inflated.
Figure 7B:
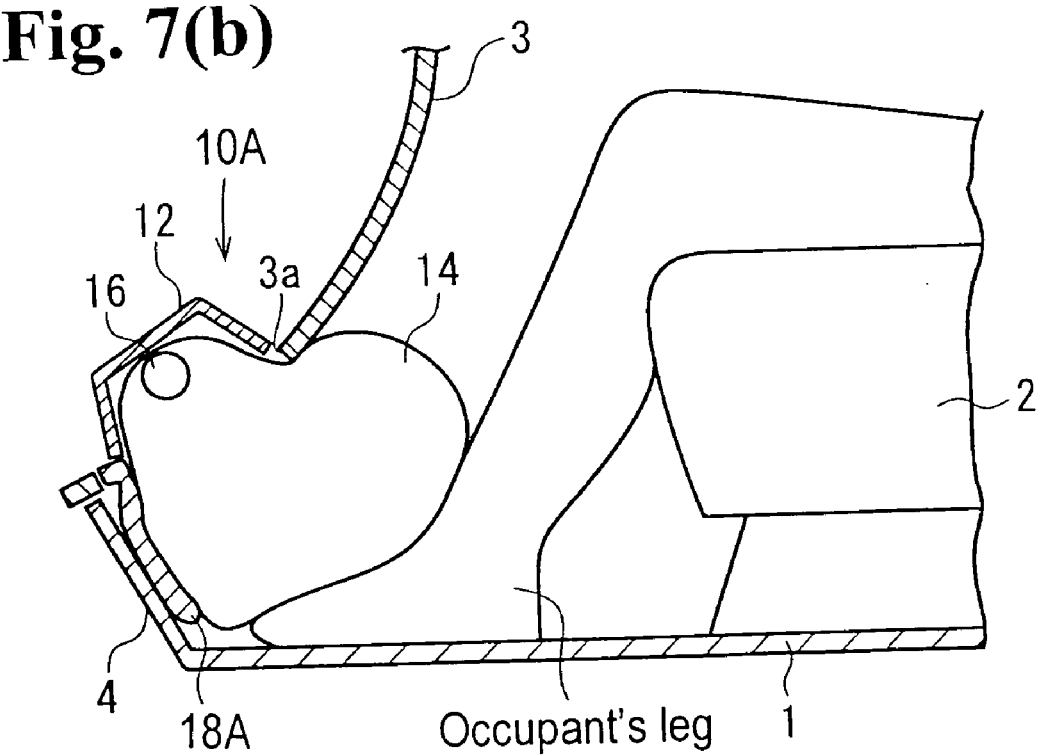

Hereunder, embodiments according to the second aspect of the present invention will be described with reference to the accompanying drawings. FIGS. 7(a) and 7(b) are sectional views of a leg protection system according to an embodiment, wherein FIG. 7(a) shows a state before an airbag is inflated, and FIG. 1(b) shows a state when the airbag is inflated.

A seat 2 is placed on a floor panel 1, and an instrument panel 3 is disposed in front of the seat 2. The instrument panel 3 is formed in a curved convex shape toward the interior of the vehicle so as to come close to a front side of a seat cushion of the seat 2. A dash panel 4 is connected to a lower end of the instrument panel 3 and a front end of the floor panel 1. The dash panel 4 extends substantially upwardly from the front end of the floor panel 1 so as to face the toes of the legs.

An opening 3a is provided at a lower part of the instrument panel 3 and at a height facing the insteps or the ankles of the legs. A leg protection system 10A is disposed on a backside of the instrument panel 3 so as to face the opening 3a. The leg protection system 10A has a casing 12 with an open front portion (facing the occupant) as a retainer, an airbag 14 housed in the casing 12 in a folded state, and an inflator 16 for inflating the airbag 14. The open front portion of the casing 12 is arranged to face the opening 3a. A lid 18A substantially flush with the instrument panel 3 covers the opening 3a.

The airbag 14 deploys only in front of the ankles or the insteps of the occupant's legs. The inflator 16 is formed in a column shape, and is arranged to pass through the airbag 14 along the width of the vehicle. The airbag 14 is joined to the casing 12 at a rear portion of the inflator 16 with a fastener (not shown). The shape of the inflator 16 is not limited to the column and it may be formed in a disk shape, etc.

When a vehicle having the leg protection system 10A with such a configuration comes in a frontal crash, the inflator 16 is activated to emit gas to inflate the airbag 14. The airbag 14 pushes the lid 18A to open, and deploys in front of the ankles or the insteps of the occupant's legs, thereby preventing the forward movement thereof.

In the leg protection system 1A, the airbag 14 deploys only in front of the ankles or the insteps of the occupant's legs. Accordingly, the airbag 14 restrains the ankles or the insteps at an early stage, thus preventing them from hitting the dash panel 4 and so on.

Figure 8:
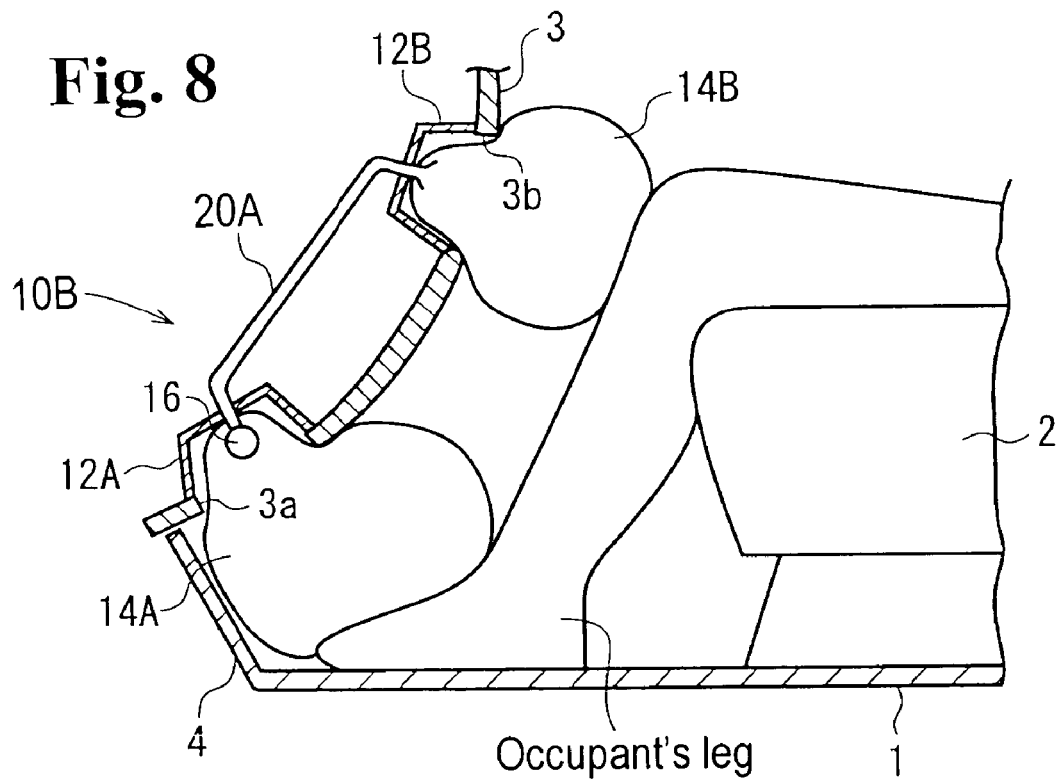
FIG. 8 is a sectional view of the leg protection system according to an embodiment of the second aspect of the present invention.

FIG. 8 is a sectional view of a leg protection system 10B according to an embodiment in a state when an ankle bag and a knee bag are inflated. According to the embodiment, the leg protection system 10B is equipped with an airbag including an ankle bag 14A that deploys only in front of the ankles or the insteps of the legs and a knee bag 14B that is separated from the ankle bag 14A and deploys only in front of the knees.

The instrument panel 3 has the opening 3a for passing the ankle bag through at a height facing the ankles or the insteps of the occupant's legs and an opening 3b for passing the knee bag through at a height facing the knees. An ankle bag casing 12A and a knee bag casing 12B are mounted on the backside of the instrument panel 3 so as to face the openings 3a and 3b, respectively. The casings 12A and 12B have open front portions facing the occupant. The open front portions face the openings 3a and 3b, respectively. The openings 3a and 3b are closed by lids (not shown) that are mounted substantially flush with the instrument panel 3.

The ankle bag 14A and the knee bag 14B are housed in the ankle bag casing 12A and the knee bag casing 12B in a folded state, respectively. The ankle bag 14A and the knee bag 14B are connected to the casings 12A and 12B with fasteners (not shown), respectively. The inflator 16 is arranged to pass through the ankle bag 14A along the width of the vehicle. According to the embodiment, the ankle bag 14A and the knee bag 14B communicate with each other through a duct 20A. One end of the duct 20A is inserted in the ankle bag 14A through a wall of the ankle bag casing 12A and is joined to a part of a gas generator (not shown) of the inflator 16. The other end of the duct 20A is inserted in the knee bag 14B through a wall of the knee bag casing 12B.

In the leg protection system 10B with such an configuration, when the inflator 16 is activated to emit the gas, a part of the gas from the inflator 16 flows directly into the ankle bag 14A and other part thereof is supplied into the knee bag 14B through the duct 20A. The gas from the inflator 16 inflates the ankle bag 14A and the knee bag 14B to push the lid to open, and the ankle bag 14A and the knee bag 14B deploy in front of the ankles or the insteps and the knees of the occupant's legs, respectively.

In the leg protection system 10B, the ankle bag 14A deploys only in front of the ankles or the insteps of the occupant's legs, and the knee bag 14B deploys only in front of the knees. Therefore, the ankle bag 14A and the knee bag 14B restrain the ankles or the insteps and the knees of the occupant's legs at an early stage, respectively, thereby effectively preventing the legs from hitting the dash panel 4 and the instrument panel 3. The knee bag 14B restrains the knees to prevent the forward movement thereof, thereby sufficiently preventing the forward movement of the thighs and the lumbar part.

In the leg protection system 10B, the ankle bag 14A and the knee bag 14B receive two portions of the occupant's legs, i.e. a lower portion (the ankles or the insteps) and an upper portion (knees), thus preventing the forward movement of the shins therebetween even if the airbags do not receive the shins directly. Accordingly, the ankle bag 14A and the knee bag 14B are inflated only at the two portions, i.e. the ankles or the insteps and the knees, respectively, so that the forward movements of the occupant's legs can be prevented. The airbags do not receive the sighs, thereby reducing a capacity of the entire airbag, and inflating the ankle bag 14A and the knee bag 14B at an early stage even with a low-output inflator.

In the airbag formed of the ankle bag 14A and the knee bag 14B separated from the ankle bag 14A, it is possible to arrange the ankle bag 14A and the knee bag 14B separately, thereby obtaining flexibility in arranging the bags 14A and 14B.

In the embodiment, the ankle bag 14A and the knee bag 14B communicate with each other through the duct 20. Alternatively, it may be sufficient to provide one inflator for inflating both the ankle bag 14A and the knee bag 14B.

In the embodiment, the inflator 16 is arranged in the ankle bag 14A. Alternatively, the inflator 16 may be arranged in the knee bag 14B, as in the leg protection system 10C shown in FIG. 9. Further, it is also possible to provide an inflator mounting section 20a in the middle of the duct 20 for mounting the inflator 16, as shown in a leg protection system 10D. The inflator may be disposed in each of the ankle bag 14A and the knee bag 14B (not shown).

Figure 9:
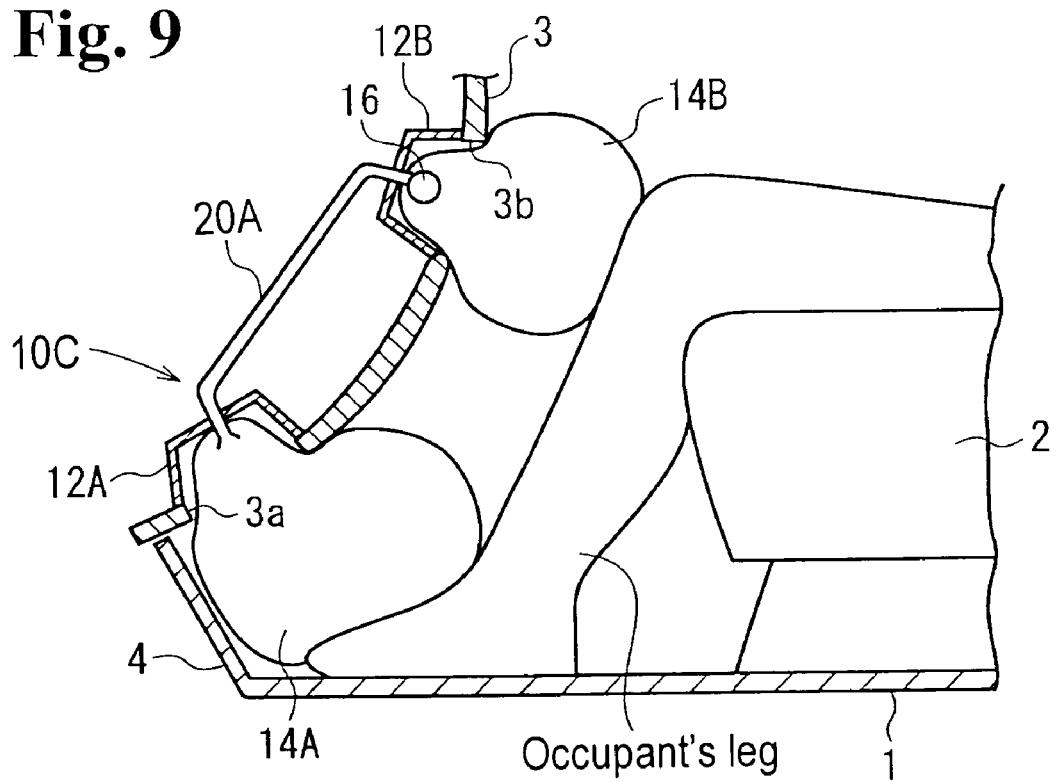
FIG. 9 is a sectional view of the leg protection system according to an embodiment of the second aspect of the present invention.

In the leg protection system 10C shown in FIG. 9, the inflator 16' is arranged to pass through the knee bag 14B along the width of the vehicle. One end of the duct 20A is inserted in the knee bag 14B and joined to a part of a gas generator (not shown) of the inflator 16, and the other end of the duct 20A is inserted in the ankle bag 14A. A part of the gas from the inflator 16 flows directly into the knee bag 14B, and other part thereof is supplied into ankle bag 14A through the duct 20A

Figure 10:
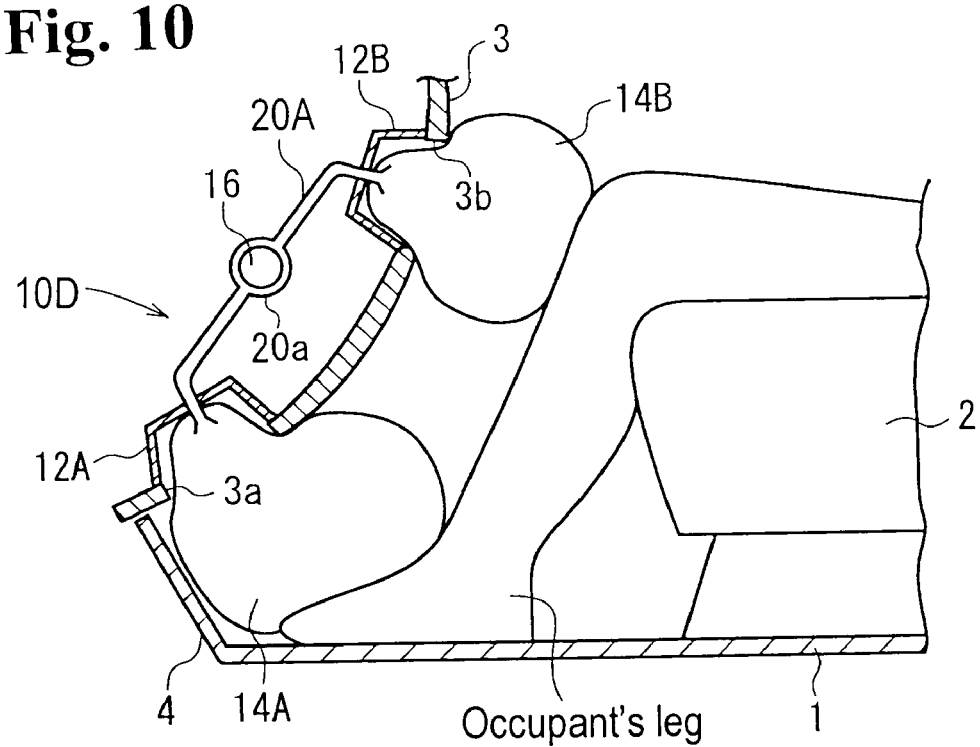
FIG. 10 is a sectional view of the leg protection system according to an embodiment of the second aspect of the present invention.

In the leg protection system 10D shown in FIG. 10, the inflator 16 is mounted to the inflator mounting section 20a in the middle of the duct 20A. Opposite ends of the duct 20A are inserted in the ankle bag 14A and the knee bag 14B, respectively. The gas from the inflator 16 flows in the duct 20A through the inflator mounting section 20a, and is delivered into the ankle bag 14A and the knee bag 14B through the duct 20A.

Other features of the leg protection system 10C and the leg protection system 10D are the same as those of the leg protection system 10A shown in FIG. 8. Therefore, the same components are given the same reference numerals, and descriptions thereof are omitted.

Figure 11:
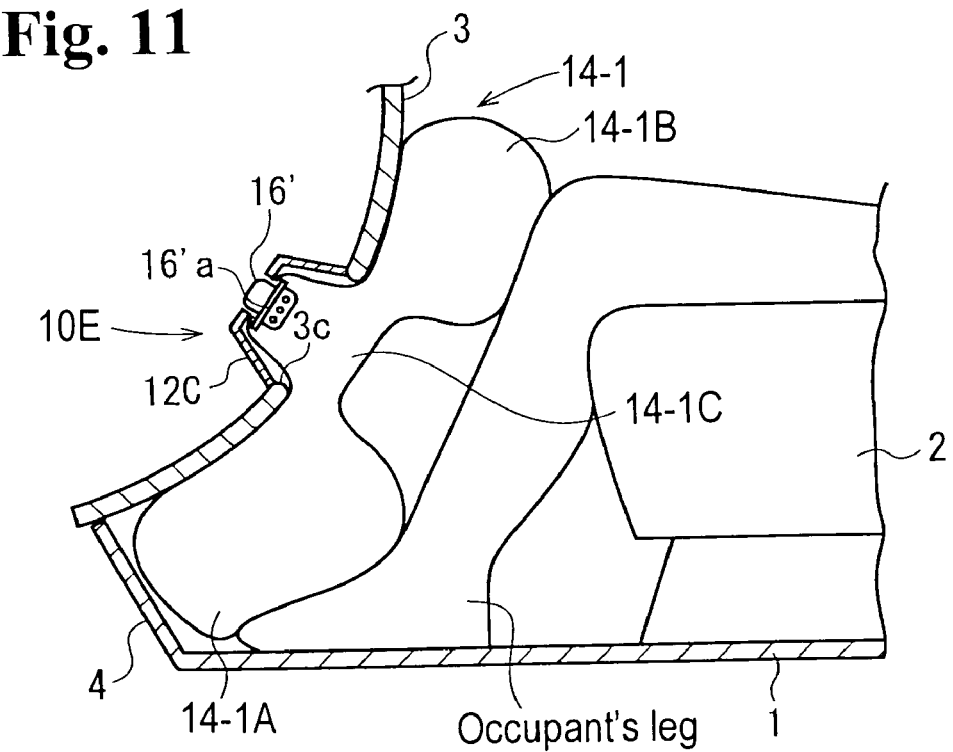
FIG. 11 is a sectional view of the leg protection system according to an embodiment of the second aspect the present invention.
Figure 12:
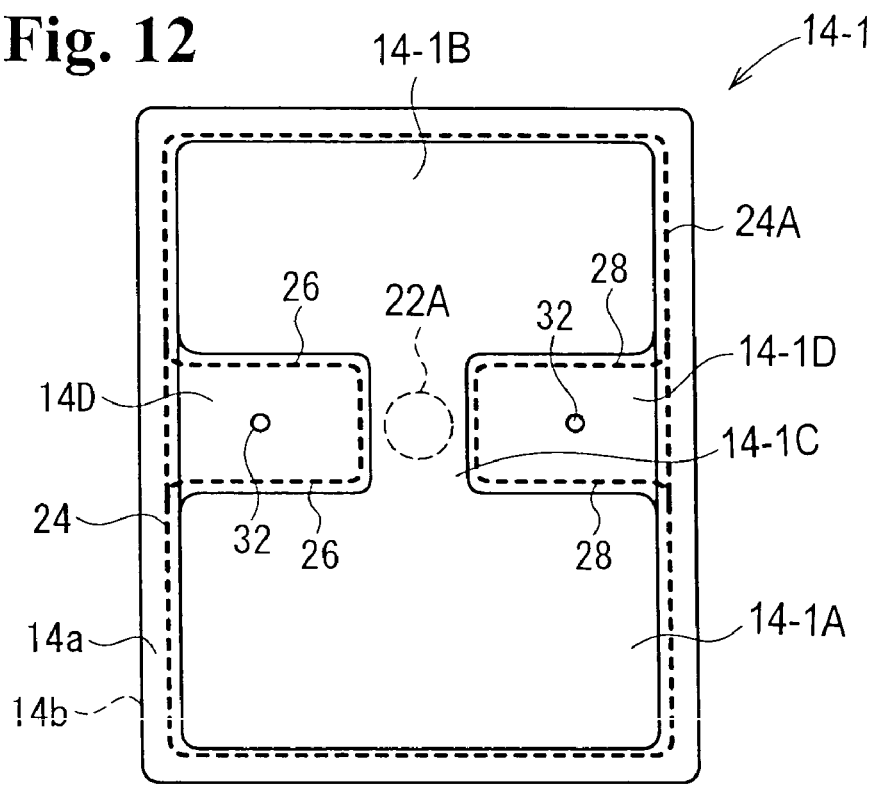
FIG. 12 is a front view of an airbag of the leg protection system shown in FIG. 11.
Figure 13:
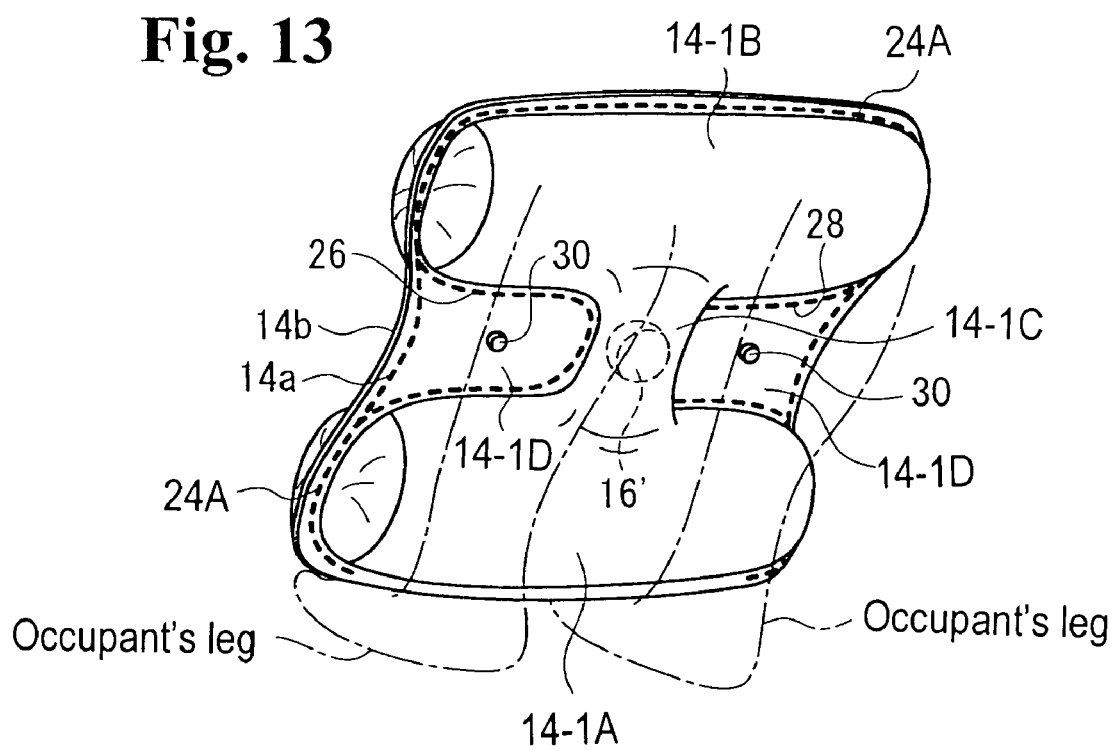
FIG. 13 is a perspective view of the airbag of the leg protection system shown in FIG. 11.

FIG. 11 is a sectional view of a leg protection system according to an embodiment. FIG. 12 is a front view of an airbag of the leg protection system; and FIG. 13 is a perspective view of the airbag. FIGS. 11 and 13 show a state when the airbag is inflated.

In this embodiment, the instrument panel 3 has an opening 3c for passing the airbag through at the middle between the height facing the ankles or the insteps of the occupant's legs and the height facing the knees. A leg protection system 10″ is mounted on the backside of the instrument panel 3 so as to face the opening 3c. The leg protection system 10E also includes a casing 12C with an open front portion (facing the occupant), an airbag 14-1 housed in the casing 12C in a folded state, and an inflator 16′ for inflating the airbag 14-1. The open front portion of the casing 12C is arranged to face the opening 3c. The opening 3c is closed by a lid mounted substantially flush with the instrument panel 3.

The airbag 14-1 is formed in a bag shape, and integrally includes an ankle section 14-1A that deploys only in front of the ankles or the insteps, a knee section 14-1B that deploys only in front of the knees, and a duct 14-1C for communicating the ankle section 14-1A and the knee section 14-1B with each other.

The inflator 16′ is formed in a disk shape, and an end of the inflator is inserted in the duct 14-1C through an inflator opening 22A (refer to FIG. 12) provided at the backside of the duct 14-1C. A flange 16′a projects radially from a peripheral side surface at the end of the inflator 16′. A periphery of the opening 22 is air-tightly sandwiched between the flange 16′a and a bottom of the casing 12C.

According to the embodiment, a front panel 14a has a substantially rectangular shape, and forms a front surface of the airbag 14-1. A rear panel 14b has a substantially the same shape as that of the front panel 14a, and forms a rear surface of the airbag 14-1. The front panel and the rear panel are overlapped and joined together along a seam 24 at the peripheries thereof, so that the airbag is formed in a bag shape. The front panel 14a and the rear panel 14b are also joined together along seams 26 and 28 extending toward the center of the airbag from the left and right sides at the middle between the front panel 14a and the rear panel 14b in the vertical direction, respectively. Accordingly, the airbag 14-1 is divided into the ankle section 14-1A, the knee section 14-1B, and the duct 14-1C.

Each of the seams 26 and 28 has a substantially U-shape, and one side extends vertically and the other two sides extend laterally parallel to the upper side and the lower side of the front panel 14a and the rear panel 14b. The sides extending vertically face with each other at the middle between the front panel 14a and the rear panel 14b in the lateral direction. A space between the sides serves as the duct 14-1C. Both ends of each of the seams 26 and 28 join the seam 24. A method of joining the front panel 14a to the rear panel 14b may include various methods such as bonding and welding in addition to stitching.

Areas 14-1D of the airbag 14-1 surrounded by the seams 26 and 28 are not inflated, and are provided with holes 32 for inserting fasteners 30 (refer to FIG. 13) such as bolts therethrough. The fasteners 30 are fastened to the casing 12C through the holes 32, so that the areas 14-1D of the airbag 14-1D are fastened to the casing 12C.

In the leg protection system 10E with such an arrangement, when the inflator 16′ is activated to emit the gas, a part of the gas from the inflator 16′ flows into the duct 14-1C and then flows into the ankle section 14-1A and the knee section 14-1B through the duct 14-1C. The ankle section 14-1A and the knee section 14-1B are inflated by the gas from the inflator 16′ to push the lid to open, so that the ankle section 14-1A and the knee section 14-1B deploy in front of the ankles or the insteps and the knees of the occupant's legs, respectively.

In the leg protection system 10E, the ankle section 14-1A deploys, only in front of the ankles or the insteps of the occupant's legs, and the knee section 14-1B deploys only in front of the knees. Therefore, the ankle section 14-1A and the knee section 14-1B restrain the ankles or the insteps and the knees of the occupant's legs at an early stage, respectively, thereby preventing them from hitting against the dash panel 4 and the instrument panel 3. The knee section 14-1B restrains the knees, thereby sufficiently preventing the forward movement of the thighs and the lumbar part.

Further, in the occupant's leg protection system 10E, the ankle section 14-1A and the knee section 14-1B receive two portions of the occupant's legs, i.e. the lower portion (the ankles or the insteps) and the upper portion (the knees), thereby preventing the forward movements of the occupant's legs even if the airbag does not receive directly the shins between the two portions. Accordingly, it is possible to reduce the capacity of the entire airbag 14″.

The leg protection system 10E has the airbag 14-1 formed in a single bag. Thus, it is sufficient to provide one casing (retainer) 12C for housing the airbag 14-1, thereby facilitating a process of mounting the leg protection system 10E to the vehicle body.

In the embodiment, the inflator 16′ is arranged in the duct 14-1C. Alternatively, the inflator 16′ may be arranged in the ankle section 14-1A. In this case, the opening 3c for passing the airbag is arranged at the lower part of the instrument panel 3 at a height facing the ankles or insteps of the occupant's legs, and the casing 12C is arranged at the height facing the opening 3c (not shown). A backside of the ankle section 14-1A of the airbag 14-1 is connected to the casing 12C.

In the leg protection system with such an arrangement, the ankle section 14-1A first deploys in front of the ankles or the insteps of the occupant's legs, and the airbag 14-1 then deploys upwardly to inflate the knee section 14-1B in front of the knees by the gas from the inflator 16′. Thus, the ankle section 14-1A restrains the ankles or the insteps of the occupant's legs at an early stage, thereby preventing the forward movement thereof. The knee section 14-1B restrains the knees, thereby sufficiently preventing the forward movement of the knees, the thighs, and the lumbar part.

Figure 14:
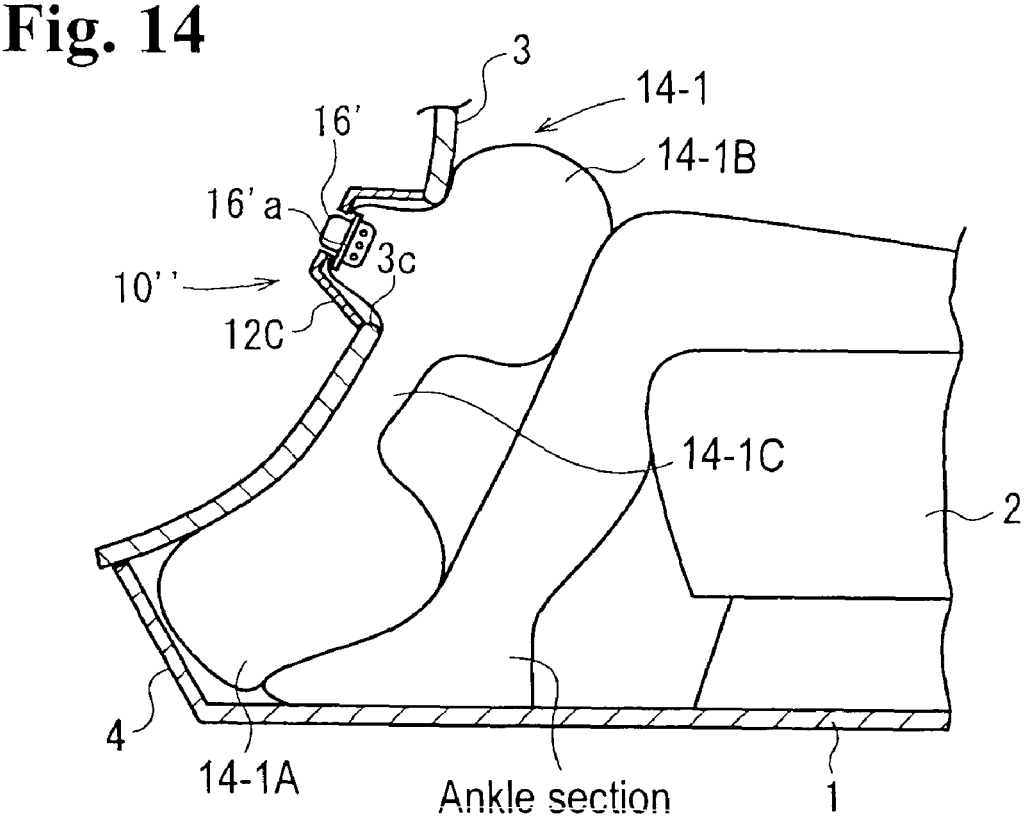
FIG. 14 is a sectional view of the leg protection system according to an embodiment of the second aspect the present invention.

As shown in FIGS. 11 to 13, the inflator 16′ is arranged in the duct 14-1C of the airbag 14-1. Alternatively, the inflator 16′ may be arranged in the knee section 14-1B, as shown in FIG. 14. Other features shown in FIG. 14 are the same as those in FIG. 11, and the same numerals designate the same components.

Figure 15:
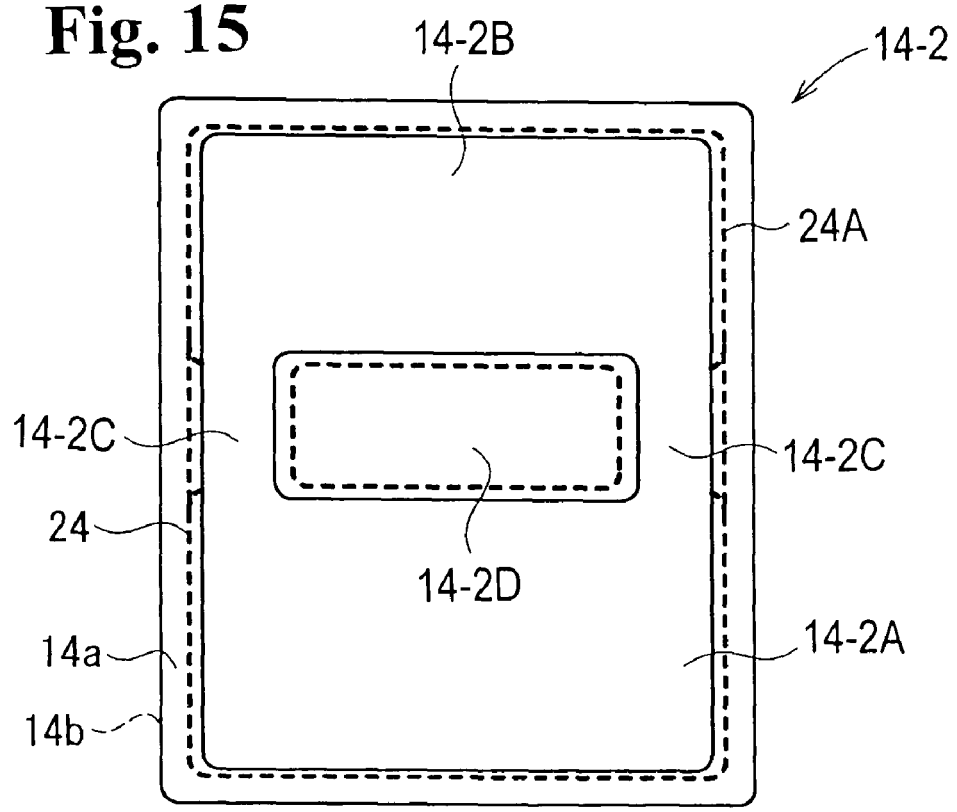
FIG. 15 is a front view of an airbag according to an embodiment of the second aspect of the present invention.

The duct 14-1C shown in FIGS. 11 to 13 is arranged at the center of the airbag 14-1 in the lateral direction. Alternatively, the duct 14-2C may be arranged along each of the left and right sides of the airbag 14-2, as shown in FIG. 15. Other features shown in FIG. 15 are the same as those in FIG. 12, and the same or similar numerals designate the same or similar components.

As described above, the leg protection system according to the second aspect of the present invention is capable of restraining the ankles or the insteps at an early stage. The leg protection system can also sufficiently prevent the forward movements of the knees, the thighs, and the lumbar part of the occupant.

Figure 16:
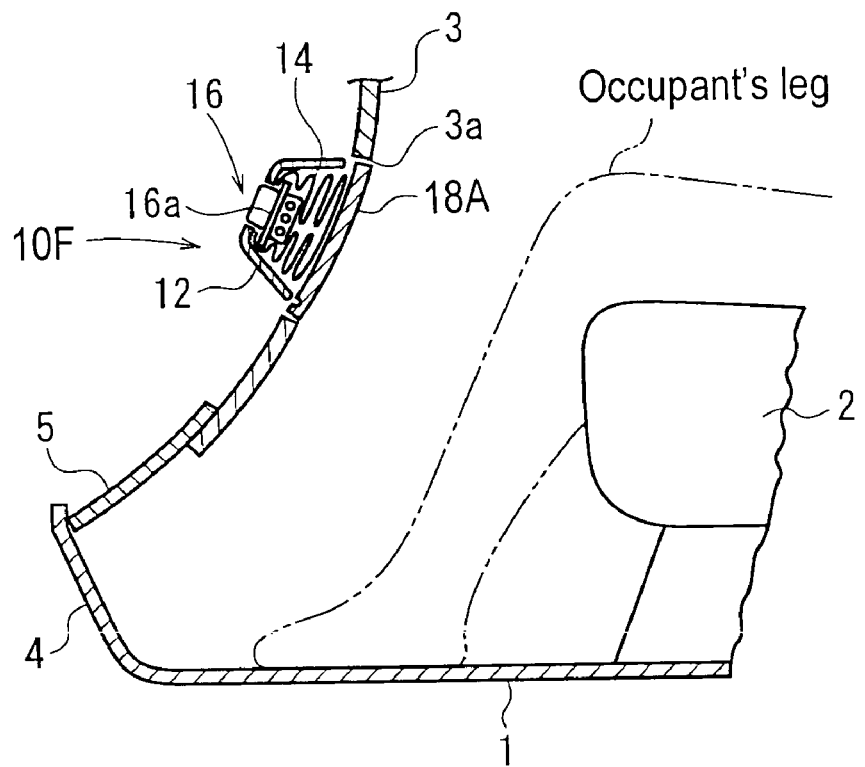

Hereunder, embodiments of the third aspect of the invention will be described with reference to the accompanying drawings. FIGS. 16(*a*) and 16(*b*) are sectional views of a vehicle having a leg protection system according to an embodiment of the invention, wherein FIG. 16(*a*) shows a state before an airbag is inflated, and FIG. 16(*b*) shows a state when the airbag is inflated.

A seat 2 is placed on a floor panel 1, and an instrument panel 3 is disposed in front of the seat 2. The instrument panel 3 has a curved convex shape toward the interior of the vehicle so as to come close to the front of the seat cushion of the seat 2. A dash panel 4 is arranged to connect a lower end of the instrument panel 3 and a front end of the floor panel 1. The dash panel 4 extends substantially upwardly from the front end of the floor panel 1 so as to face the toes of occupant's legs. There is a space between the lower end of the instrument panel 3 and the dash panel 4.

A closing panel 5 is provided between the instrument panel 3 and the dash panel 4 so as to close the space. The closing panel 5 is arranged substantially flush with the instrument panel 3. The closing panel 5 is securely fixed to a vehicle body member with a joint such as a bracket or another joining means (not shown). The closing panel 5 may be mounted to the instrument panel 3, the dash panel 4, or both of the instrument panel 3 and the dash panel 4. The closing panel 5 may be mounted to a rigid member other than the instrument panel 3 and the dash panel 4.

The closing panel 5 is arranged at the backside of the instrument panel 3 as shown in FIGS. 16(*a*) and 16(*b*). Alternatively, the closing panel 5 may be arranged on the front side of the instrument panel 3, or fitted in the space between the lower end of the instrument panel 3 and the dash panel 4.

The closing panel 5 has panel strength and mounting strength sufficient to support a force that is applied when the ankles or the insteps of the occupant's legs press a lower part of an inflated airbag 14 (described later) strongly against the closing panel 5. When the occupant seats in the seat 2 in a normal position wherein in the leg lower than the knee, the toe is located forward, the ankle or the instep of the leg faces the closing panel 5, as shown in the drawing.

An opening 3a for the airbag is provided to the instrument panel 3 so as to face the occupant's legs. A leg protection system 10F is placed on a backside of the instrument panel 3 so as to face the opening 3a. The leg protection system 10F has a casing 12 with an open front portion (facing the occupant), an airbag 14 housed in the casing 12 in a folded state, and an inflator 16 for inflating the airbag 14. The open front portion of the casing 12 is arranged to face the opening 3a. The opening 3a is closed by a lid 18 mounted substantially flush with the instrument panel 3.

The airbag 14 deploys along a front surface of the instrument panel 3. When the airbag 14 is fully inflated, an upper part thereof deploys in front of the knees of the occupant and a lower part deploys in front of the ankles or the insteps, as shown in FIG. 16(*b*). The opening 3a and the leg protection system 10F are arranged around a height facing the knees of the occupant. Alternatively, they may be arranged at a height facing the shins lower than the knees.

The inflator 16 is formed in a disk shape, and an end thereof is inserted in the airbag 14 through an inflator opening (no shown) provided in the backside of the airbag 14. A flange 16a projects radially from a peripheral side surface at the end of the inflator 16. A periphery of the inflator opening is air-tightly sandwiched between the flange 16a and the bottom of the casing 12. The inflator 16 is not limited to the disk shape, and may be formed in a column shape.

When a vehicle having the leg protection system 10F with such a configuration comes in a frontal crash, the inflator 16 is activated to emit gas to inflate the airbag 14. The airbag 14 pushes the lid 18A to open, and deploys in front of the occupant's legs to receive them, thereby absorbing an impact applied to the occupant. In the leg protection system 10F, the space between the lower end of the instrument panel 3 and the dash panel 4 is blocked by the closing panel 5. Therefore, the lower part of the airbag 14 does not enter the space when the occupant's legs push the lower part of the inflated airbag 14. Therefore, it is not necessary to increase a capacity and an inner pressure of the airbag 14 in order to sufficiently receive the ankles or the insteps of the occupant as compared with a conventional device, thereby reducing a production cost of the leg protection system.

Figure 17:
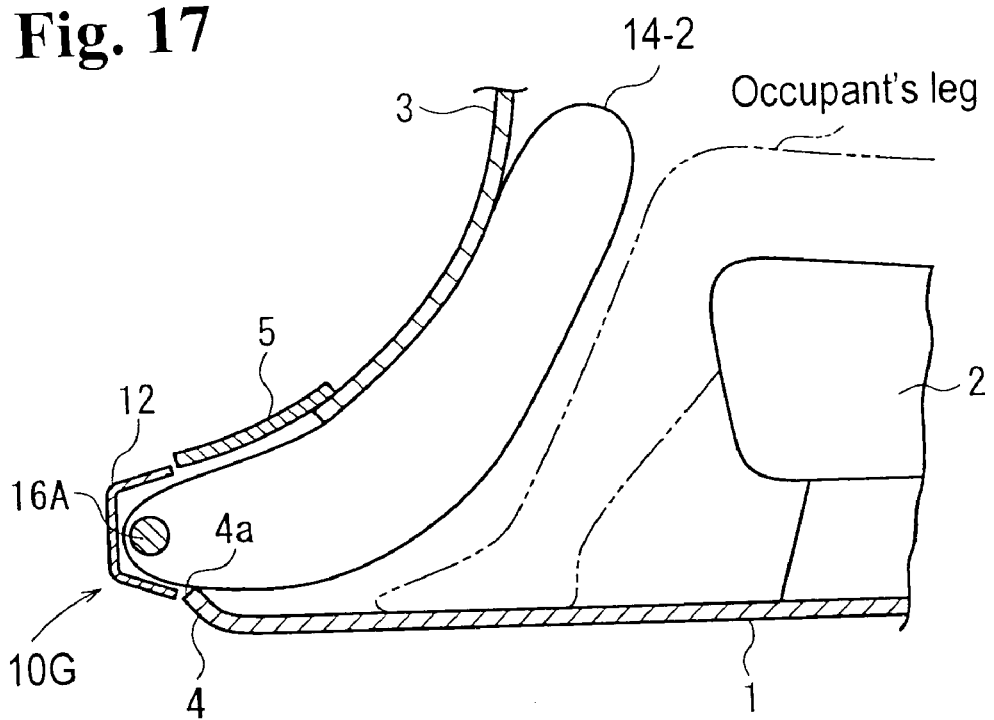
FIG. 17 is a sectional view of a vehicle having a leg protection system according to an embodiment of the third aspect of the invention.

FIG. 17 is a sectional view of a seat of a vehicle having a leg protection system according to another embodiment. In this embodiment, an opening 4a for passing the airbag therethrough is provided in the dash panel 4 in front of the toes of the occupant seated in the seat 2 in a normal position. A leg protection system 10G is disposed on the backside of the dash panel 4 so as to face the opening 4a. The opening 4a is a cut off portion of the dash panel 4 from an upper end. There is a space between the lower end of the instrument panel 3 and an upper rim of the opening 4a, and the closing panel 5 is placed to block the space. The arrangement and the mounting structure of the closing panel 5 are the same as those of the embodiment shown in FIGS. 16(*a*) and 16(*b*). The closing panel 5 faces the ankles or the insteps of the legs of the occupant seated in a normal position in the seat 2.

The leg protection system 10G includes the casing 12 with an open front facing the occupant, an airbag 14-2 housed in the casing 12 in a folded state, and an inflator 16A for inflating the airbag 14-2. The open front portion of the casing 12 is closed by a lid (not shown).

In the airbag 14-2 according to the embodiment, a lower part of the airbag 14-2 first deploys from the toes to the ankles of the occupant's legs, and an upper part of the airbag then deploys in front of the knees above the ankles. The inflator 16A is formed in a column shape and is arranged to pass through a lower end of the airbag 14-2 along the width of the vehicle. A rear portion of the inflator 16A of the airbag 14-2 is joined to the casing 12 with a fastener (not shown). The airbag 14-2 is mounted to the casing 12 along a lower side of the airbag 14-2.

Other arrangements of the vehicle including the leg protection system 10G are the same as those of the vehicle including the leg protection system 10F shown in FIG. 16(*a*). Therefore, the components in FIG. 17 same as those in FIG. 16(*a*) are given with the same reference numerals, and descriptions thereof are omitted.

In the leg protection system 102, the inflator 16A is activated to emit gas in the event of a car crash or the like.

The lower part of the airbag 14-2 first is inflated to deploy in front of the toes or the ankles of the occupant's legs by the gas from the inflator 16A, and the upper part then deploys in front of the knees above the ankles, so that the airbag 14-2 receives the occupant's legs. Also, the closing panel 5 blocks the space between the lower end of the instrument panel 3 and the dash panel 4 (the upper rim of the opening 4a). Thus, the lower part of the airbag 14-2 is prevented from entering the space when the ankles or the insteps of the occupant's legs push the lower part of the inflated airbag 14-2.

In the leg protection system 10G, the airbag 14-2 deploys in the direction opposite to the direction that the legs move forward when the occupant seats in the seat 2 in a normal position wherein in the leg lower than the knee, the toe is located forward as shown in the drawing. Therefore, the inflating airbag 14-2 applies a force to prevent the forward movement of the legs, so that the legs move forward little.

Figure 18:
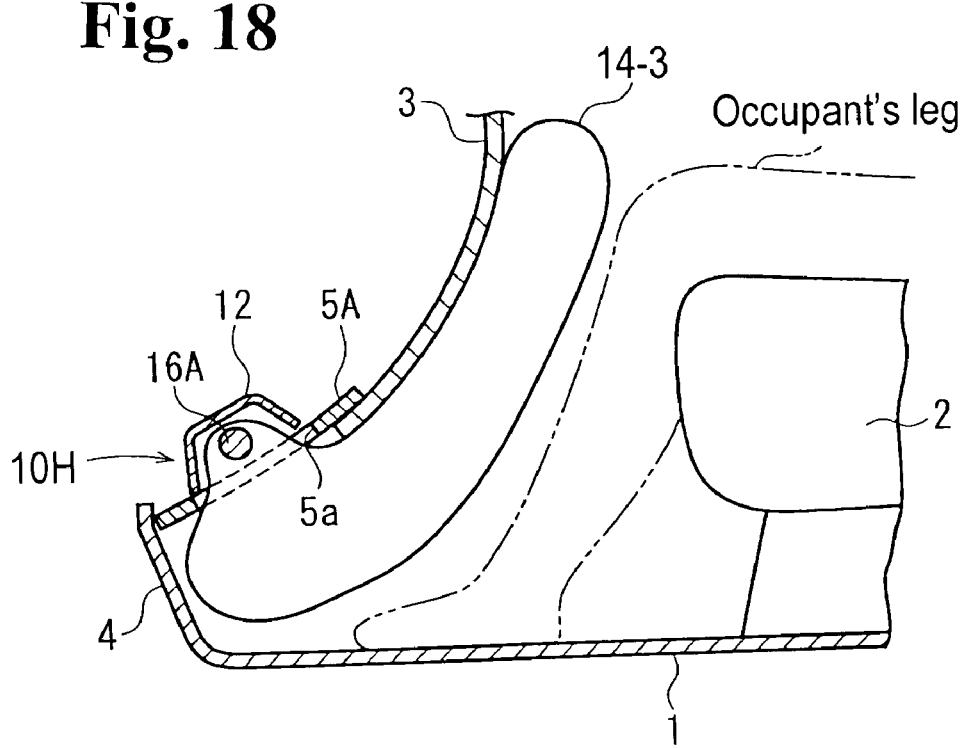
FIG. 18 is a sectional view of a vehicle having a leg protection system according to an embodiment of the third aspect of the invention.

FIG. 18 is a sectional view of a vehicle having a leg protection system 10H according to another embodiment. In this embodiment, a closing panel 5A arranged to block the space between the lower end of the instrument panel 3 and the dash panel 4 has an opening 5a for passing the airbag through. A leg protection system 10H is mounted on the backside of the closing panel 5A so as to face the opening 5a. The mounting structure of the closing panel 5A is similar to that of the closing panel 5 according to the embodiments of FIGS. 16(a) and 17.

Figure 16B:
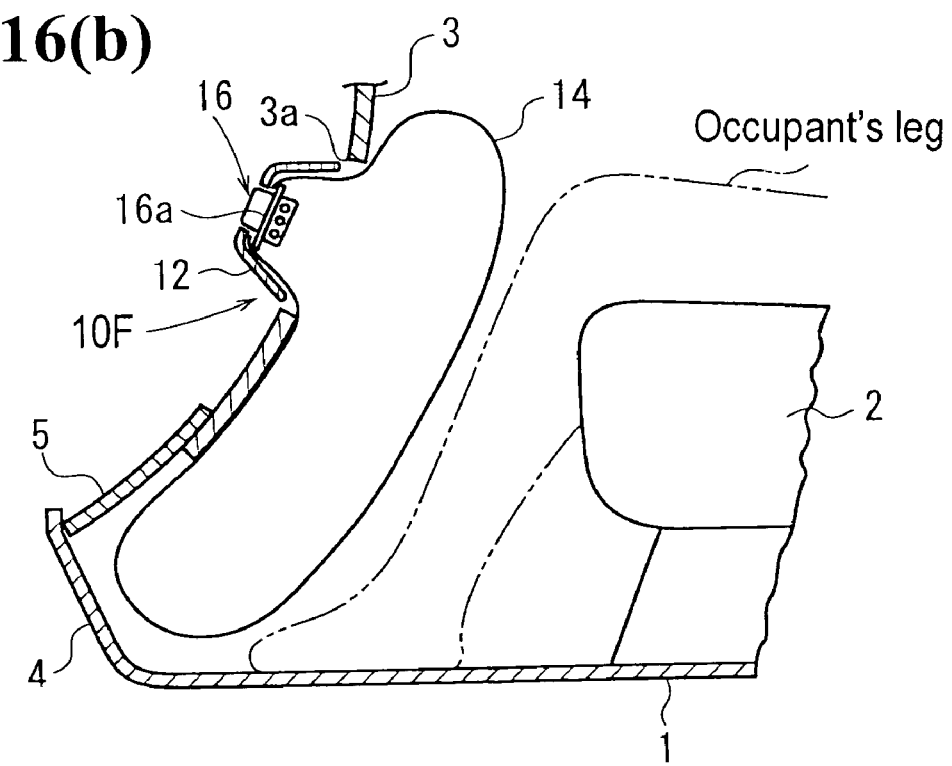

The leg protection system 10H includes the casing 12 with an open front (facing the occupant), an airbag 14-3 housed in the casing 12 in a folded state, and the inflator 16A for inflating the airbag 14-3. The open front of the casing 12 is closed by a lid (not shown). In the airbag 14-3, the lower part of the airbag 14-3 first deploys in front of the ankles or the insteps of the occupant's legs, and the upper part then deploys in front of the knees above the ankles, as in the airbag 14-F shown in FIGS. 16(a) and 16(b). The inflator 16A is formed in a column shape with the structure same as that shown in FIG. 17, and is arranged to pass through the lower part of the airbag 14-3 along the width of the vehicle. A rear portion of the inflator 16A of the airbag 14-3 is joined to the casing 12 with a fastener (not shown). The airbag 14-3 is mounted to the casing 12 along a lower side of the airbag 14-3, as in the airbag 14-2.

Other arrangements of the vehicle including the leg protection system 10G are the same as those of the vehicle including the leg protection system 10F shown in FIG. 16(a). Therefore, the components shown in FIG. 18 same as those shown in FIG. 16(a) are given the same or similar reference numerals, and descriptions thereof are omitted.

In the leg protection system 10H, the inflator 16A is activated to emit gas in the event of a car crash or the like. The lower part of the airbag 14-3 is first inflated to deploy in front of the toes or the ankles of the occupant's legs by the gas from the inflator 16A, and the upper part then deploys in front of the knees above the ankles, so that the airbag 14-3 receives the occupant's legs. The closing panel 5A blocks the space between the lower end of the instrument panel 3 and the dash panel 4. Therefore, the lower part of the airbag 14B is prevented from entering the space when the ankles or the insteps of the occupant's legs push the lower end of the inflated airbag 14-3.

In the leg protection system 10H, the airbag 14-3 deploys in the direction opposite to the direction that the legs move forward when the occupant seats in the seat 2 in a normal position, as shown in the drawing. Therefore, the airbag 14-3 applies a force to prevent the forward movement of the legs, so that the legs move forward little.

Figure 19:
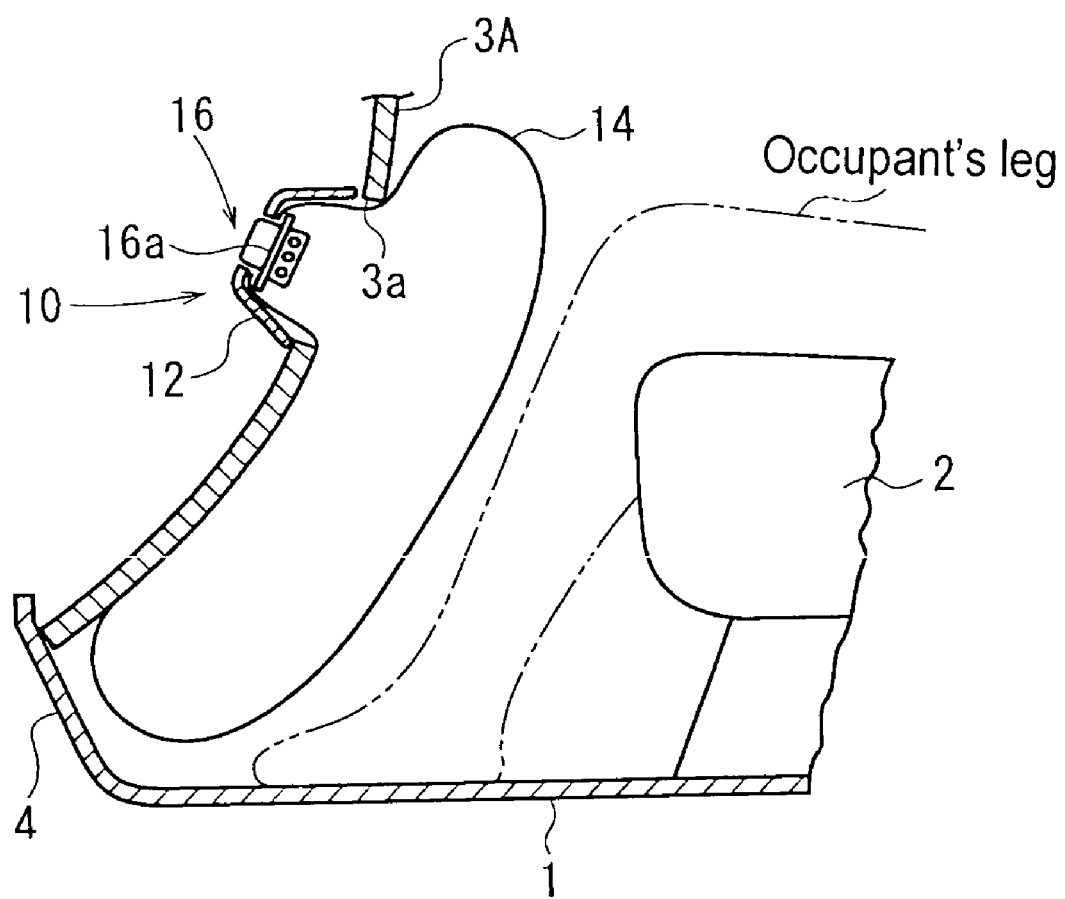
FIG. 19 is a sectional view of a vehicle having a leg protection system according to an embodiment of the third aspect of the invention.

FIG. 19 is a sectional view of a vehicle having a leg protection system according to another embodiment. In the embodiment, a lower end of an instrument panel 3A extends toward an upper end of the dash panel 4, as shown in the drawing. Accordingly, there is substantially no space between the lower end of the instrument panel 3A and the dash panel 4. The instrument panel 3A has the opening 3a arranged to face the occupant's legs, and the leg protection system 10 is mounted on the backside of the instrument panel 3A to face the opening 3a.

The arrangements of the vehicle including the leg protection system 10 are the same as those of the vehicle including the leg protection system 10 shown in FIG. 16(a). Therefore, the same components having the same functions are given the same reference numerals.

In the leg protection system 10, the inflator 16 is activated to emit gas in the event of a car crash. The airbag 14 is inflated in front of the occupant's legs by the gas from the inflator 16. The airbag 14 receives the occupant's legs. There is substantially no space between the lower end of the instrument panel 3A and the dash panel 4. Therefore, the lower part of the airbag 14 is prevented from entering when the toes or the insteps of the occupant's legs push the lower part of the inflated airbag 14, so that the inflated airbag 14 securely receives the toes or the insteps.

In FIG. 19, the opening 3a and the leg protection system 10 are arranged in the vicinity of a height facing the knees of the occupant. Alternatively, they may be arranged in the vicinity of a height facing the shins below the knees, or at the lower end of the instrument panel 3A so as to face the ankles or the insteps of the occupant's legs. Also, the dash panel 4 may have an opening (not shown), as in the embodiment shown in FIG. 17, and the leg protection system may be arranged on the backside of the dash panel 4 so as to face the opening. In the embodiment, the leg protection system is disposed at one of the instrument panel, the dash panel, and the closing panel. A plurality of the leg protection systems may be disposed at several positions. The closing panels 5 and 5A are separated from the instrument panel 3 and the dash panel 4, and they may be integrated to one.

In the embodiments shown in FIGS. 16(a) to 17, the closing panels 5 and 5A are securely fixed to the vehicle body member and the like. Alternatively, the closing panels 5 and 5A may be mounted to the vehicle body member through an impact-absorbing mechanism such as a bracket capable of deforming plastically for absorbing the impact when the closing panels 5 and 5A are subjected to a sudden load from the airbag 14. The closing panels 5 and 5A may be constructed to deform for absorbing the impact when a predetermined load or higher is applied.

As described above, according to the third aspect of the present invention, the leg protection system has no space between the lower end of the instrument panel and the dash panel. Therefore, the lower part of an airbag is prevented from retracting into the space when the ankles or the insteps of the occupant's legs push the lower part of the inflated airbag.

While the invention has been explained with the specific embodiments of the invention, the explanation is illustrative and the invention is limited only by the appended claims.

What is claimed is:

1. A leg protection system for protecting a leg of an occupant, comprising:
   one airbag for protecting an ankle and a knee of the occupant, the airbag comprising
   a first chamber, a second chamber separate from the first chamber, and
at least one duct connecting the first chamber and the second chamber for providing communication therebetween; and an inflator connected to the airbag for inflating the airbag, wherein said first and second chambers are spaced apart from each other by a predetermined distance, and are connected together by the at least one duct, said at least one duct having a width less than those of the first and second chambers;

said one airbag comprises a front panel and a rear panel joined together along a first connection at peripheries thereof, and along second connections at a middle portion between the front panel and the rear panel in a vertical direction, respectively, so as to divide the one airbag into the first chamber, the second chamber, and the at least one duct;

said second connections extend toward a center area of the airbag from left and right sides between the front panel and the rear panel in the vertical direction;

each of the second connections has a substantially U-shape with one side extending vertically and two other sides extending laterally parallel to an upper side and a lower side of the front panel and the rear panel;

wherein in each U-shaped connection, the one vertical side extends continuously between the two other sides;

the vertically extending sides face each other at the middle portion of the front panel and the rear panel in the lateral direction; and a space between the vertically extending sides defines one duct.

2. A vehicle comprising:

the leg protection system according to claim 1 for protecting the leg of the occupant, an instrumental panel, a dash panel disposed below the instrument panel, and a closing panel extending from a lower end of the instrumental panel for closing a space between the lower end of the instrument panel and the dash panel so that the airbag is disposed between the instrument panel and the leg of the occupant when the airbag is inflated.

3. A vehicle according to claim 2, wherein said protection system is disposed on at least one of the instrument panel, the dash panel, and the closing panel.

4. A vehicle comprising:

the leg protection system according to claim 1 for protecting the leg of the occupant, an instrumental panel, and a dash panel extending from a lower end of the instrumental panel so that the airbag is disposed between the instrument panel and the leg of the occupant when the airbag is inflated.

* * * * *